United States Patent
Oguma et al.

(10) Patent No.: US 9,512,873 B2
(45) Date of Patent: Dec. 6, 2016

(54) BEARING DEVICE AND HYDRAULIC MACHINE

(71) Applicant: KABUSHIKI KAISHA TOSHIBA, Minato-ku (JP)

(72) Inventors: Tadashi Oguma, Yokohama (JP); Makoto Mikami, Arakawa-ku (JP); Than Trong Long, Yokohama (JP); Yasumi Kizaki, Yokohama (JP); Masaji Tsutsui, Yokohama (JP); Fumio Takimoto, Yokohama (JP); Naritoshi Nakagawa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 582 days.

(21) Appl. No.: 14/046,455

(22) Filed: Oct. 4, 2013

(65) Prior Publication Data

US 2014/0037451 A1    Feb. 6, 2014

Related U.S. Application Data

(63) Continuation of application No. PCT/JP2012/002390, filed on Apr. 5, 2012.

(30) Foreign Application Priority Data

Apr. 5, 2011    (JP) ................................. 2011-084114

(51) Int. Cl.
*F16C 17/14*    (2006.01)
*F03B 3/06*    (2006.01)
(Continued)

(52) U.S. Cl.
CPC ................ *F16C 17/14* (2013.01); *C23C 4/06* (2013.01); *F03B 3/06* (2013.01); *F03B 11/06* (2013.01);
(Continued)

(58) Field of Classification Search
CPC    F16C 17/14; F05B 2240/53; F05B 2260/98; F03B 11/06

USPC .......................................................... 384/315
See application file for complete search history.

(56) References Cited

U.S. PATENT DOCUMENTS 3,286,994 A * 11/1966 Manna ..................... B01F 7/22
366/285
4,892,419 A    1/1990 Inoue et al.

FOREIGN PATENT DOCUMENTS

CN    1031750    3/1989
DE    341146 C    9/1921
(Continued)

OTHER PUBLICATIONS

Extended European Search Report issued Feb. 2, 2015 in Patent Application No. 12768151.8.
(Continued)

*Primary Examiner* — Craig Kim
*Assistant Examiner* — Michael Sehn
(74) *Attorney, Agent, or Firm* — Oblon, McClelland, Maier & Neustadt, L.L.P.

(57) ABSTRACT

A bearing device of embodiment is usable for a hydraulic machine having a rotary shaft of a vertical shaft, with a water tank storing lubrication water, and a bearing pad supporting a skirt member on the rotary shaft in the lubrication water. The bearing device has a first supporting mechanism slidably supporting the bearing pad from the radial direction, and a second supporting mechanism slidably supporting the bearing pad from a bottom portion side in an axial direction. One of a supporting surface supporting the bearing pad in the first supporting mechanism and a supported surface supported by the supporting surface in the bearing pad is formed in a convex shape. One of a supporting surface supporting the bearing pad in the second supporting mechanism and a supported surface supported by the supporting surface in the bearing pad is formed in a convex shape.

23 Claims, 24 Drawing Sheets

(51) Int. Cl.
*F03B 11/06* (2006.01)
*F16C 17/03* (2006.01)
*F16C 33/10* (2006.01)
*C23C 4/06* (2016.01)

(52) U.S. Cl.
CPC ............ *F03B 11/066* (2013.01); *F16C 17/03* (2013.01); *F16C 33/1025* (2013.01); *F05B 2240/53* (2013.01); *F05B 2250/711* (2013.01); *F05B 2260/98* (2013.01); *Y02E 10/223* (2013.01); *Y02E 10/226* (2013.01)

(56) References Cited

FOREIGN PATENT DOCUMENTS

| JP | 54-137535 A | 10/1979 |
|----|---|---|
| JP | 56-46116 | 4/1981 |
| JP | 61-42114 | 9/1986 |
| JP | 62-228671 | 10/1987 |
| JP | 63-314372 | 12/1988 |
| JP | 1-14452 | 3/1989 |
| JP | 1-65420 | 4/1989 |
| JP | 3-46018 | 4/1991 |
| JP | 4-36072 | 2/1992 |
| JP | 6-217486 | 8/1994 |
| JP | 2000-081034 | 3/2000 |
| JP | 2001-323927 | 11/2001 |
| JP | 2003-028146 | 1/2003 |
| JP | 2008-95565 | 4/2008 |
| JP | 2008-240842 | 10/2008 |
| JP | 4527183 | 6/2010 |

OTHER PUBLICATIONS

International Preliminary Report on Patentability issued Oct. 8, 2013, in International application No. PCT/JP2012/002390.
Written Opinion issued Jul. 10, 2012, in International application No. PCT/JP2012/002390 (English translation).
International Preliminary Report on Patentability issued Oct. 17, 2013, in International application No. PCT/JP2012/002390.
International Search Report issued on Jul. 10, 2012 for PCT/JP2012/002390 filed on Apr. 5, 2012 with English Translation.
International Wrriten Opinion issued on Jul. 10, 2012 for PCT/JP2012/002390 filed on Apr. 5, 2012.

* cited by examiner

BEARING DEVICE AND HYDRAULIC MACHINE

CROSS-REFERENCE TO RELATED APPLICATIONS

This application is a continuation of prior International Application No. PCT/JP2012/002390 filed on Apr. 5, 2012, which is based upon and claims the benefit of priority from Japanese Patent Application No. 2011-084114 filed on Apr. 5, 2011; the entire contents of all of which are incorporated herein by reference.

FIELD

Embodiments described herein relate generally to a bearing device and a hydraulic machine.

BACKGROUND

Conventionally, a water-lubricated resin bearing has been used in a hydraulic machine such as a Kaplan turbine. In general, a phenol resin which is a thermosetting resin is used as this resin, but since the phenol resin does not have high wear resistance against hard foreign matters such as soil and sand in water, clean water from which foreign matters are removed via a strainer is supplied as a lubricant to a sliding surface of the bearing. Further, since water absorption of the phenol resin is high, when the bore of the bearing is machined, the phenol resin is retained in a state of being dipped in water in advance, and machining is performed after the phenol resin is sufficiently swelled. This is because the phenol resin swells in operation and the bearing gap becomes small, which impairs bearing performance. Further, an adhesive is used for joining a base metal and a bearing material, a cylindrical bearing is formed so as to suppress increase in local contact pressure and transmit a bearing load to the entire base metal, and a bearing length is long for increasing a bearing load capacity itself. In this case, if shaft vibrations are large, an uneven contact may occur between the shaft and a bearing end portion, causing a failure, abnormal wear, or the like.

On the other hand, there is known a device in which the bearing material is ceramic and the bearing structure is a pad type. This pad-type ceramic bearing device is characterized in that it has a pad-type bearing disposed around a rotary shaft and having a ceramic layer on a sliding surface and a load supporting member supporting this pad-type bearing, river water is used as a lubricant for the bearing, and foreign matter entrance preventing means are provided on or around the pad-type bearing for preventing entrance of foreign matters between the pad-type bearing and the bearing load supporting member. The foreign matter entrance preventing means are constituted of a leaf spring, a coil spring, a pressure adjusting mechanism for adjusting a contact pressure of the pad-type bearing via an adjuster having a spherical tip shape, and an elastic supporting mechanism elastically supporting the pad bearing from a lower side with two or more coil springs, and by operation of these mechanisms the pad bearing is in slide contact with an opponent rotary shaft via a water film.

Moreover, there is known a pad-type bearing in which a bearing slide contact surface material is a resin and polyphenylene sulfide series or fluorine-based resin is used for this resin. It is inferior in wear resistance but is superior in shock resistance compared to ceramic materials, and thus allows to effectively utilize an elastic press-contact mechanism which elastically presses the bearing slide contact surface against an opponent shaft sleeve. Consequently, entrance of foreign matters can be prevented by press-contact of the shaft and the bearing during a stoppage period, and increase of the bearing gap can be prevented when the resin wore off, enabling formation of an appropriate water film.

Further, there is known a guide bearing device in which a bearing slide contact surface material is a polyetheretherketone resin, and a guide sector is press contacted by a spring or press contacted by a damper and a spring. Reliability of the guide bearing can be improved by absorbing and damping axial displacements accompanying axial vibrations by the spring. When water is used as a lubricant, as compared to the case where turbine oil is used, rigidity of a wedge film and a damping constant decrease to about one several tenths. However, the guide sector is pressed against a rotary shaft by an adjusting bolt (or a spring or a spring and a damper) provided on a rear surface thereof, and the gap between the rotary shaft and the guide sector is small. Thus, excessive vibrations of a rotor do not occur, and a rotary electrical machine can be operated normally.

Further, there is known a guide bearing device for rotary electrical machine in which a pivot pivotally supports a guide bearing from an outside in a radial direction, the guide bearing is supported in a vertical direction by a support plate, and a bearing gap can be adjusted by performing expansion and contraction of the pivot by an actuator connected to the pivot in the guide bearing device for rotary electrical machine. This device rationalizes adjustment of the bearing gap that requires skill in the guide bearing device in which the rear surface of the guide bearing is supported with the pivot, and a vertical direction of the guide bearing is supported with a flat surface. When dispersion of this bearing gap is large among guide bearings, this adversely affects bearing performance such as bearing load capacity, bearing temperature, and the like.

Furthermore, there is known a bearing gap adjusting device for guide bearing device for vertical shaft rotary electrical machine in which a pad supporting part such as an adjusting bolt is not a pivot, but a spherical pivot fitted in a pad recessed portion is provided for adjusting the bearing gap.

Further, regarding positioning of a thrust bearing, there is known a thrust bearing in which the outer wheel of a ball bearing, which is a spherical bearing, is fixed to or closely contacted with a pad lower side portion, and the inner wheel of this ball bearing is attached to a pad holder, thereby allowing adjusting a radial tilt and a circumferential tilt with reference to a pivot. In the case of such a structure, the thrust bearing can tilt by a required amount about the pivot, and thus an oil film pressure with respect to a thrust load can be generated constantly between the pad and a thrust collar.

SUMMARY

Although oil lubrication has been used conventionally for guide bearings for hydraulic machine such as a hydraulic turbine, in view of avoiding river pollution due to oil leak, there are increasing occasions for extending use of water-lubricated bearings instead of oil lubrication even for Pelton wheels which have more strict use conditions. In one-shot operation when a flow rate is low as one mode of high-efficiency operation of the Pelton wheels, the surface pressure of the hydraulic turbine bearing becomes high, and hence a water-lubricated bearing with high reliability even at high surface pressures is indispensable. In one-shot operation, a large radial load acts on a bucket, and hence not only increase in bearing surface pressure but also shaft tilting is large. Thus, a bearing which does not cause abnormal wear, damage, or the like of the bearing pad due to uneven contact is necessary.

In the device in which the pad-type bearing is supported from the radial direction and the vertical direction by the coil springs, the pad-type bearing is press contacted against the shaft without intervention of a water film during a stoppage period of the hydraulic wheel. When a dynamic pressure (water film pressure) occurs along with rotation of the shaft, operation is continued while the bearing gap is retained in a state that a bearing reaction force according to this water film pressure and a spring force are balanced. Further, when the shaft is tilted, the coil springs supporting empty weight of the pad-type bearing elastically deform, thereby tiltingly supporting the pad-type bearing according to the tilt of the shaft.

In a fluid-lubricated state, the radial load acting on the bearing balances with the bearing reaction force according to the water film pressure, but this water film pressure is affected by easiness of wedge formation in the bearing circumferential direction and by the shape thereof (wedge angle). When formation of the wedge is insufficient, the water film pressure decreases, that is, the water film thickness decreases, the range of solid contact between the shaft and the bearing increases, and there is a possibility that the fluid lubricated state cannot be maintained. In the case of the support by coil spring, the pad-type bearing slides on the vertical direction spring when the wedge is formed, or torsional elastic deformation in the vertical direction spring is necessary. Thus, momentary wedge formation and creation of a large wedge angle are difficult. Similarly, the press-contact force of the radial direction coil spring acts in a direction to decrease the bearing reaction force according to the water film pressure, and a balance of force occurs in a state that the water film is thin as compared to the conditions without coil springs. When disturbance such as axial vibration acts in this state, it is possible that the balance is lost and a lack of water film occurs, and the shaft and the bearing solid contact with each other, thereby damaging the bearing. Further, since the vertical direction spring generates a force which attempts to make the pad-type bearing be always vertical, when the shaft tilts by the radial load acting on a runner, also a possibility of solid contact with the shaft may increase at an upper end of an anti-load side pad-type bearing and a lower end of a load-side pad-type bearing.

Further, to assist wedge formation of the pad-type bearing in operation of the hydraulic wheel, the radial dimension of the pad-type bearing is normally larger than the radial dimension of the shaft, and thus even if the pad-type bearing is press contacted against the shaft during the stoppage period, a minute gap occurs partially between the shaft and the pad-type bearing. Since the lubrication water is also stationary during the stoppage period, water is not exchanged in this gap, and there is also a concern that gap corrosion and pitting corrosion occur when it becomes not possible to maintain a passive film of the shaft due to insufficient oxygen.

The device which damps axial vibrations with a spring and a damper to reduce vibration energy transmitted to a tank holding an adjusting bolt so as to improve reliability is uncertain to be realized, and requires basic techniques such as disposition of the damper and the spring, a relation of magnitude of absorption energy and a method for retaining a guide sector, and the like. Further, since alcohol such as methanol has high volatility, keeping and securing the bearing performance require liquid level securing means, and when it is mixed with condensation water or the like, there is also a problem of generating heat and making it difficult to secure the water film due to decrease in viscosity. Moreover, although it is said that there are no excessive vibrations because the bearing gap is minute, a method of supporting empty weight of the guide sector and followability to shaft tilting are unclear, and thus when wear proceeds in a locally high surface pressure state of the bearing accompanying the shaft tilting, there is also a concern that large vibrations are induced as a result.

In the device which operates an actuator according to deviations of bearing gap initial values and current values in operation to keep the bearing gap constant, there is a level difference between a sensor position for measuring the current value and the bearing position, and thus it is possible that a calculation error occurs and a correct axial gap cannot be secured when the shaft is tilted. Further, when the amplitude of axial vibration is large, adjustment of bearing gap is performed according to the period of vibration. For example, when the period of vibration is synchronous with a rotation speed, the frequency in the case of a hydraulic turbine generator of 600 $min^{-1}$ is 10, but when adjustment of bearing gap is performed frequently in this manner, it is difficult to say that an optimal wedge is formed every time the adjustment is performed. That is, an optimal bearing gap is not secured due to a time delay between measurement and actuator operation, and possibilities of inducing decrease in bearing load capacity and increase in shaft vibration are also conceivable.

In the wedge forming technique with a spherical pivot attached to a pad, there is a limit in followability to a drag and shaft tilting during wedge formation. When the bearing load becomes large, easiness of forming the wedge film and high followability to the shaft tilting are necessary for maintaining the bearing performance.

In the device in which a pad acts around a pivot and a ball bearing around a pad holder, when the outer wheel of the ball bearing and a pad lower portion are fixed or closely contacted, it is difficult to make the both move cooperatively due to different center points. To put it into practical use, determination of a structure for realizing the idea is a challenge.

As described above, in conventional devices, there are no or insufficient considerations for the followability to the shaft tilting of the bearing pad when a high radial load acts and for easiness of formation of the wedge film. Further, there are insufficient considerations for the structure of a guide bearing incorporating a water-lubricated bearing.

It is an object of embodiments of the present invention to provide a water-lubricated bearing (bearing device) which exhibits excellent bearing performance under actual hydraulic wheel operating conditions in which a bearing part peripheral speed ranges from low to high and a bearing average surface pressure ranges from low to high, has excellent corrosion resistance, can prevent abnormal bearing wear, and is adaptable when an abnormal event of water level decrease occurs, and a hydraulic machine having this bearing device.

A bearing device of an embodiment is a bearing device for a hydraulic machine having a rotary shaft of a vertical shaft. The bearing device of the embodiment has a water tank storing lubrication water, and a bearing pad supporting from a radial direction a skirt member provided on the rotary shaft in the lubrication water. The bearing device of the embodiment also has a first supporting mechanism slidably supporting the bearing pad from the radial direction in the lubrication water, and a second supporting mechanism slidably supporting the bearing pad from a bottom portion side in an axial direction in the lubrication water. One of a supporting surface supporting the bearing pad in the first supporting mechanism and a supported surface supported by the supporting surface in the bearing pad is formed in a convex shape. Further, one of a supporting surface supporting the bearing pad in the second supporting mechanism and a supported surface supported by the supporting surface in the bearing pad is formed in a convex shape.

DETAILED DESCRIPTION

First Embodiment

Figure 1A:
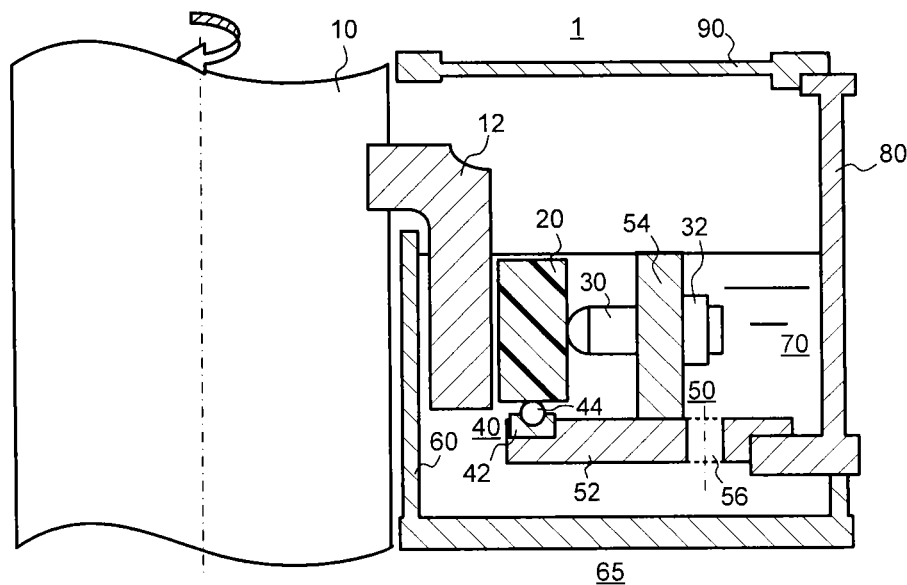
FIG. 1A is a vertical cross-sectional view illustrating a structure of a guide bearing of a first embodiment.
Figure 1B:
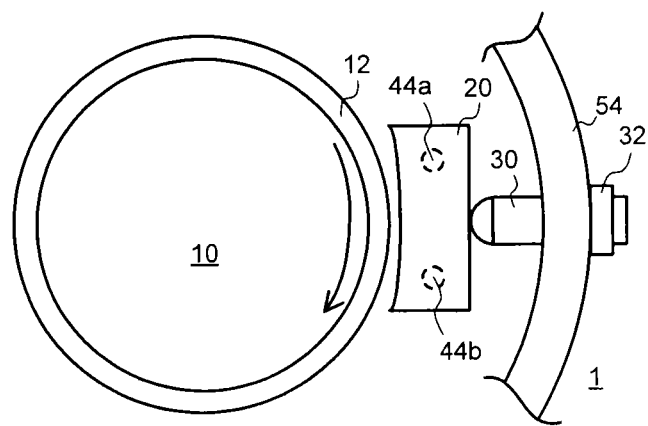
FIG. 1B is a plan view illustrating a structure in the vicinity of a bearing pad in the guide bearing of the first embodiment.
Figure 2A:
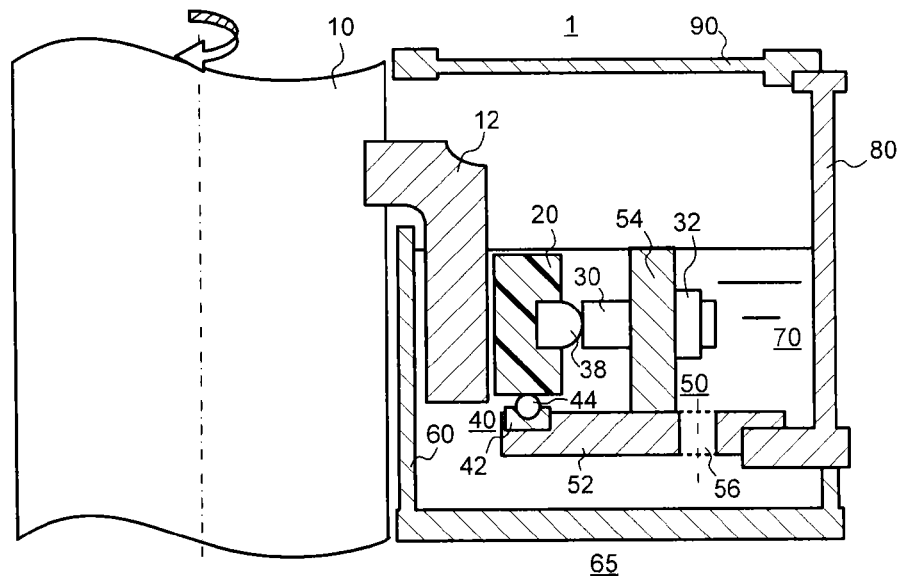
FIG. 2A is a cross-sectional view illustrating a structure of a modification example of the bearing pad in the guide bearing of the first embodiment.
Figure 2B:
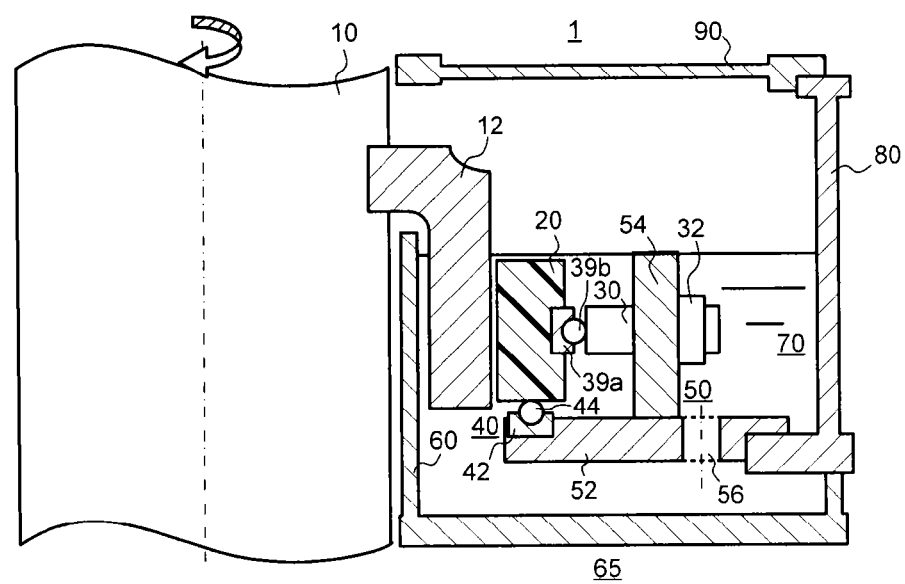
FIG. 2B is a cross-sectional view illustrating a structure of a modification example of the bearing pad in the guide bearing of the first embodiment.
Figure 2C:
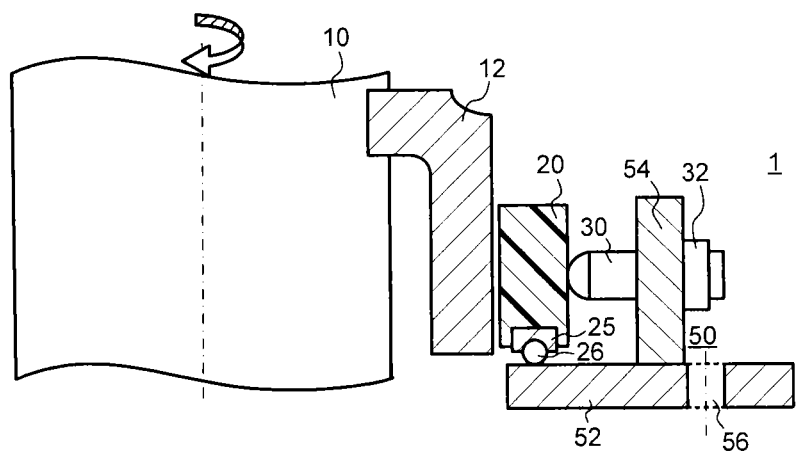
FIG. 2C is a cross-sectional view illustrating a structure of a modification example of the bearing pad in the guide bearing of the first embodiment.

Hereinafter, embodiments will be described in detail with reference to the drawings. FIG. 1A is a vertical cross-sectional view illustrating a structure of a guide bearing of a first embodiment, and FIG. 1B is a plan view similarly illustrating a structure in the vicinity of a bearing pad in the guide bearing. FIGS. 2A, 2B, and 2C are views illustrating modification examples of the guide bearing illustrated in FIG. 1A.

As illustrated in FIG. 1A, a plurality of guide bearings 1 of the embodiment are disposed along a circumferential surface of the rotary shaft 10 of a vertical shaft to which a hydraulic wheel or the like is connected for example. A guide bearing 1 is supported on a circumferential edge portion of the rotary shaft 10 by a bearing stand 80 having a wall surface coaxial with the circumferential edge surface and by a bearing support stand 50 provided to extend toward the rotary shaft 10 from the wall surface of the bearing stand 80. A water cylinder 60 is disposed below the guide bearing 1, and the guide bearing 1 is housed in a water tank 65 constituted of the water cylinder 60 and the bearing stand 80. The water tank 65 is formed along the circumferential surface of the rotary shaft 10, houses the guide bearing 1, and stores water 70 as a lubricant. Further, an upper surface of the water tank 65 is covered with a bearing cover 90.

On the rotary shaft 10, a shaft skirt 12 extending in a radial direction from the circumferential surface thereof and bending downward (thrust direction) is disposed, and the water tank 65 is disposed so that the circumferential surface of the rotary shaft 10 and an inner circumferential surface of the shaft skirt 12 sandwich an inner circumferential side wall surface of the water tank 65 (water cylinder 60).

The shaft skirt 12 guided from the inner circumferential side wall surface of the water tank 65 into the water tank 65 is sandwiched between the inner circumferential side wall surface of the water tank 65 and a bearing pad 20. The bearing pad 20 is retained by the bearing support stand 50, and in slide contact with an outer circumferential surface of the shaft skirt 12 of the rotary shaft 10 via the water 70. The bearing support stand 50 has a donut-shaped disc 52 formed coaxially with the rotary shaft 10 and supporting the bearing pad 20 from below (thrust direction), and a ring plate 54 formed coaxially with the rotary shaft 10 on the disc 52 and supporting the bearing pad 20 from the radial direction (outer circumferential direction). In the disc 52, a hole 56 is formed on an outer circumferential side of the ring plate 54. The water tank 65 is separated into an upper layer and a lower layer with the disc 52 being interposed therebetween, and the upper layer of the water tank 65 is separated into an inner layer and an outer layer with the ring plate 54 being interposed therebetween. The hole 56 formed in the disc 52 communicates the upper layer and the lower layer of the water tank 65.

On an inner circumferential side end portion of the disc 52, a ball bearing unit 40 is disposed. The ball bearing unit 40 is constituted of a base 42 as a base portion and balls 44 disposed in a recessed portion formed in the base 42, and the bearing pad 20 is abutted on upper ends of the balls 44, thereby supporting the bearing pad 20 from below. In the ring plate 54, a hole is formed in the radial direction (radial direction of the rotary shaft 10), and an adjusting bolt 30 is screwed into this hole. The adjusting bolt 30 is directly screwed or fixed to the ring plate 54 via a not-illustrated bush. A tip portion of the adjusting bolt 30 has a spherical shape, and abuts on an outer circumferential side of the bearing pad 20 to support the bearing pad 20 from the outer circumferential side (radial direction). That is, the bearing pad 20 is supported rotatably and slidably by end portions of the balls 44 and an end portion of the adjusting bolt 30. The bearing support stand 50 is fixed by a not-illustrated bolt and/or the like to the bearing stand 80. The bearing stand 80 and the water cylinder 60 forming the water tank 65 and the bearing cover 90 are fixed by a not-illustrated bolt and/or the like.

The shaft skirt 12 is sandwiched between the inner circumferential side wall surface of the water cylinder 60 (water tank 65) and the bearing pad 20 via a predetermined gap (bearing gap). The bearing gap can be provided by adjusting an insert amount of the adjusting bolt 30 in the radial direction of the rotary shaft 10, and the adjusting bolt 30 can be fixed to the ring plate 54 by fastening an adjusting nut 32 of ter the bearing gap is adjusted. Note that the disc 52 (donut plate) of the bearing support stand 50 may be constituted of two divided outer and inner discs with the rotary shaft 10 being the center, and the ball bearing unit 40 may be fixed to the inner disc 52. In this case, the inner and outer discs 52 are fixed to each other by screwing.

As illustrated in FIG. 1B, the bearing pad 20 is supported by two ball bearing units 40 (balls 44a and 44b) from below in the guide bearing 1 at one position. Further, as illustrated in FIG. 1B, the balls 44a and 44b of the ball bearing unit 40 are adjusted so as to make heights of respective top portions become the same so that the bearing pad 20 is disposed horizontally. This is because when a difference occurs in heights of the top portions of the balls 44a and 44b, relative tilting occurs on an axial center line of the rotary shaft 10 and the bearing pad 20, and thus high bearing performance cannot be obtained. In this case, there is a possibility that a partial contact occurs to cause abnormal wear of the bearing pad 20, and a concern that vibrations of the bearing pad 20 occur also arises. Having the same heights of the top portions of the balls 44a and 44b can solve such problems.

Note that in the guide bearing 1 illustrated in FIG. 1A, the tip of the adjusting bolt 30 is made as a spherical shape (convex shape) so as to support an outer circumferential side flat surface (or it may be a concave shape) of the bearing pad 20 from the radial direction, and the ball bearing unit 40 with a tip having a convex shape is provided on the disc 52 of the bearing support stand 50 so as to support a bottom portion side flat surface (or it may be a concave shape) of the bearing pad 20 from a bottom portion side in an axial direction, but it is not restrictive. As illustrated in FIGS. 2A and 2B, a support seat 38 having a convex shape or a ball bearing unit constituted of a base 39a and a ball 39b may be provided on the outer circumferential side of the bearing pad 20, and the bearing pad 20 may be supported from the radial direction by an adjusting bolt 30 with an end surface having a planar shape (or a concave shape). Moreover, as illustrated in FIG. 2C, a ball bearing unit constituted of a base 25 and a ball 26 may be provided on a bottom portion of the bearing pad 20, and the disc 52 having a planar shape (or a concave shape) may support the bearing pad 20 from the bottom portion side in the axial direction via the ball 26.

In the case where the tip of the adjusting bolt 30 is a spherical shape and the outer circumferential side of the bearing pad 20 is a concave shape for supporting the bearing pad, when a radius of the spherical surface is Ro and a radius of the concave curved surface is Rb, preferably, a relation $$Rb \geq 1.4Ro$$

is established therebetween. This is because it is known that the bearing load capacity becomes maximum when Ro/Rb=0.6 to 0.7, and at that time, a relation $$Rb=(1.4 \text{ to } 1.7)Ro \approx 1.5Ro$$

exists. Further, when Rb is smaller than 1.4Ro, followability of the bearing pad 20 to shaft tilting of the rotary shaft 10 deteriorates.

This relation is established in either the case where the outer circumferential surface or the bottom surface of the bearing pad 20 is formed in a concave shape or the case where the end surface of the adjusting bolt 30a or the disc 52 is formed in a concave shape.

Figure 3A:
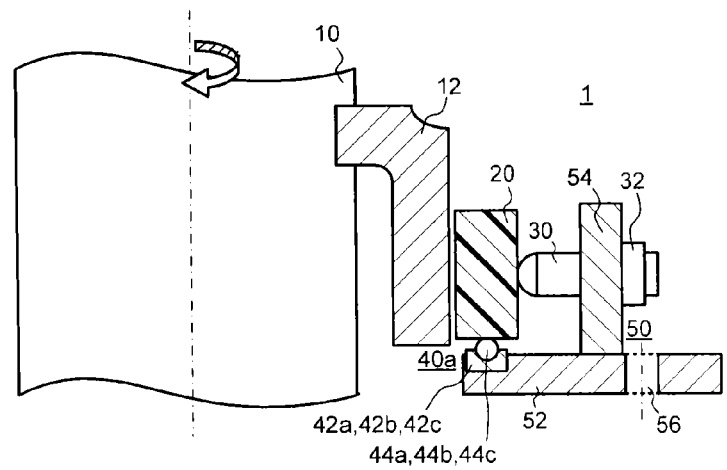
FIG. 3A is a cross-sectional view illustrating a structure of a modification example of a ball bearing in the guide bearing of the first embodiment.
Figure 3B:
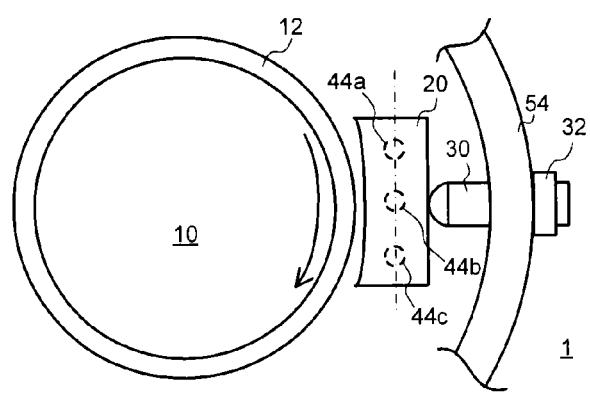
FIG. 3B is a plan view illustrating a structure of a modification example of the ball bearing in the guide bearing of the first embodiment.
Figure 3C:
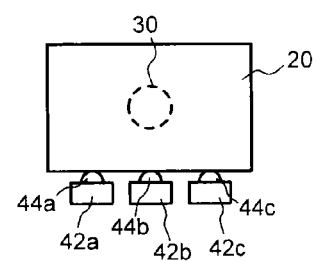
FIG. 3C is a front view illustrating a front appearance of the ball bearing in the guide bearing of the first embodiment.

Note that as illustrated in FIG. 3A to FIG. 3C, the number of balls disposed in the ball bearing unit 40 may be three for the guide bearing 1 at one position. In this case, balls 44a to 44c disposed on bases 42a to 42c of the ball bearing unit 40 are disposed on one straight line, and heights of respective top portions of the balls 44a to 44c are made the same. This is for making loads acting on the individual balls be appropriate and also for preventing inhibition of the followability to the shaft tilting, in the case where the size of the bearing pad 20 is large and the load acting on the ball bearing unit 40 is large. When the disposition of the balls 44a to 44c are deviated from the straight line, this becomes equivalent to the case where the bearing pad 20 is supported by surface, where the followability to the shaft tilting of the rotary shaft 10 is impaired significantly and performance such as bearing load capacity is also impaired. Accordingly, the top portions of the three balls 44a to 44c of the ball bearing unit 40 are adjusted to be the same heights with a shim (not illustrated) or the like.

(Disposed Position of the Bearing Pad)

Next, a disposition of the bearing pad in the guide bearing of the embodiment will be described. FIG. 4A to FIG. 4D are views describing the center of gravity of the bearing pad in the guide bearing of the embodiment.

Figure 4A:
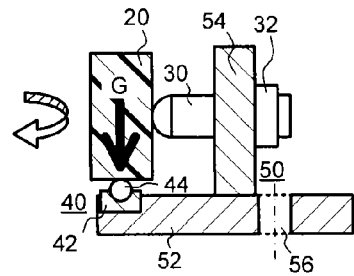
FIG. 4A is a vertical cross-sectional view describing a disposition of the bearing pad in the guide bearing of the first embodiment.
Figure 4B:
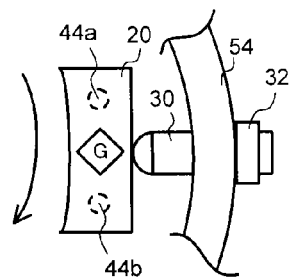
FIG. 4B is a plan view describing the disposition of the bearing pad in the guide bearing of the first embodiment.

As illustrated in FIG. 4A and FIG. 4B, the bearing pad 20 is disposed so that its center of gravity G acts on the balls (a straight line formed by the balls) of the ball bearing unit 40. This is because the bearing pad 20 becomes stable. However, as illustrated in FIG. 4C and FIG. 4D, the bearing pad 20 may be disposed so that its center of gravity G acts on an inner circumferential side of the straight line formed by the balls of the ball bearing unit 40.

The relative positional relation between the bearing pad 20 and the ball bearing unit 40 is desirably such that the center of gravity of the bearing pad 20 is located on the straight line formed by the balls of the ball bearing unit 40, as illustrated in FIG. 4A and FIG. 4B. However, considering dispersion of the relative positional relation between the rotary shaft 10 and the bearing pad 20 during a stoppage period, and the like, the position of the ball bearing unit 40 (and its balls) may be determined so that the center of gravity of the bearing pad 20 comes on the inner circumferential side of the straight line connecting the top portions of the balls of the ball bearing unit 40. When the lubrication water flows into the bearing gap of the bearing pad 20 accompanying rotation of the rotary shaft 10, strictly in the circumferential direction of the rotary shaft 10 the water flows therein from upstream of a rotation direction, and in the vertical direction the water flows therein from below.

Figure 4C:
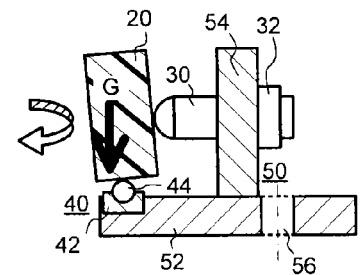
FIG. 4C is a vertical cross-sectional view describing a disposition of the bearing pad in the guide bearing of the first embodiment.
Figure 4D:
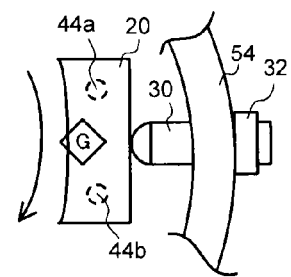
FIG. 4D is a plan view describing the disposition of the bearing pad in the guide bearing of the first embodiment.

For example, when the bearing pad 20 is tilted toward the rotary shaft 10 side during a stoppage period of the rotary shaft 10 as illustrated in FIG. 4C and FIG. 4D, a wedge (wedge whose lower side is open) is formed in a vertical direction with respect to the bearing gap of the bearing pad 20, and thus flow of the lubrication water into the bearing gap from below the bearing pad 20 can be assisted in the initial stage of rotation of the rotary shaft 10. That is, a contribution to early water film formation in the bearing gap of the bearing pad 20 can be made.

Note that a dynamic pressure is generated accompanying rotation of the rotary shaft 10, and then the bearing pad 20 is raised vertically from the tilting position by this dynamic pressure and is brought to a state parallel to the shaft skirt 12. Therefore, shaft tilting followability equivalent to that of the disposition of the bearing pad 20 illustrated in FIG. 4A and FIG. 4B can be exhibited.

Figure 16:
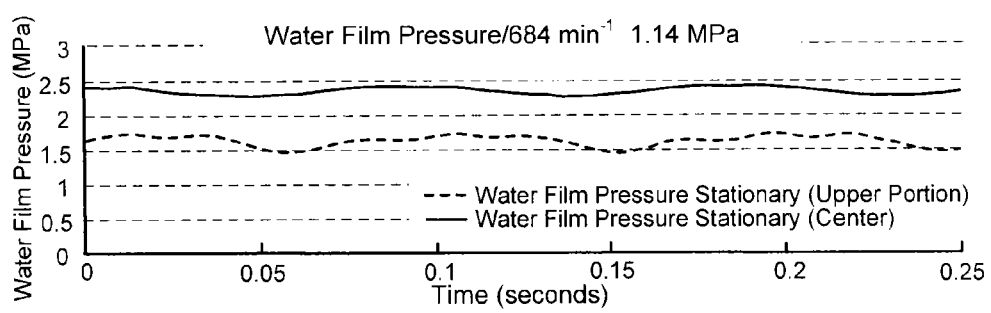
FIG. 16 is a diagram illustrating a water film pressure at the center in a bearing height direction and at an upper portion of about ⅔ of an upper half height when the bearing average surface pressure is varied at the same rotation speed in the guide bearing of the first embodiment.

FIG. 16 illustrates, with the height of the bearing pad 20 being 2 L, a water film pressure at the point of $\frac{2}{3}$L ("UPPER PART" in the diagram) above the center in the height direction of the bearing pad 20 and the center point in the height direction (likewise "CENTER"). As illustrated in FIG. 16, the water film pressure is about 2.35 MPa at the center point in the height direction of the bearing pad 20, whereas the water film pressure is about 1.63 MPa at the point of $\frac{2}{3}$L above the center in the height direction of the bearing pad 20. Specifically, a drop of the water film pressure at the upper point is about 30 percent as compared to that at the center point in the height direction of the bearing pad 20, and it can be seen that a high water film pressure is obtained. From this water film pressure, the bearing pad 20 is raised from the tilted direction to the vertical direction and is brought to a state parallel to the opposing shaft skirt 12.

(Disposed Position of the Ball Bearing Unit)

Next, dispositions of the ball bearing unit on the guide bearing of the embodiment will be described. FIG. 5A to FIG. 5D are views similarly describing the dispositions of the ball bearing unit.

Figure 5A:
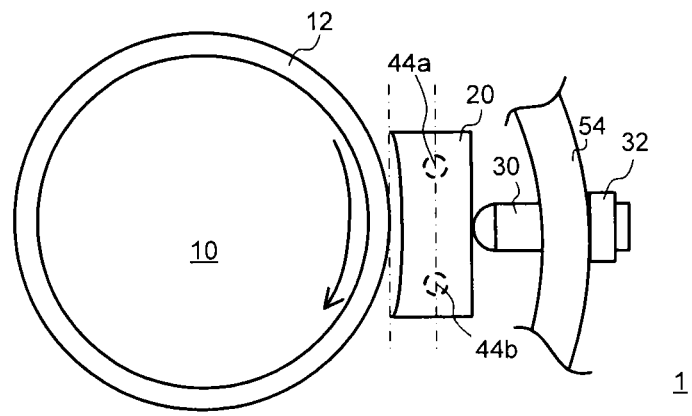
FIG. 5A is a plan view describing a disposition of the ball bearing in the guide bearing of the first embodiment.
Figure 5B:
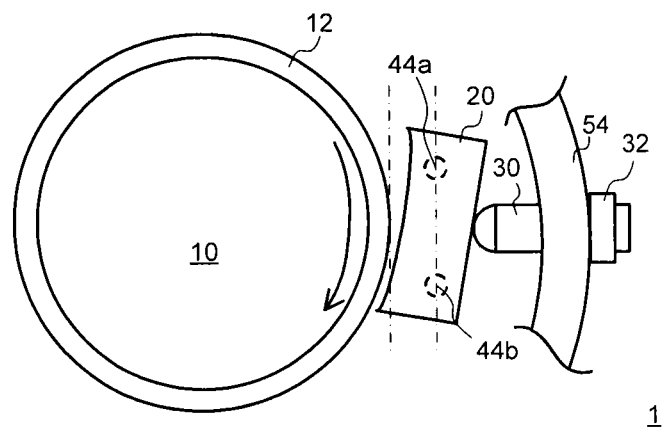
FIG. 5B is a plan view describing the disposition of the ball bearing in the guide bearing of the first embodiment.
Figure 5C:
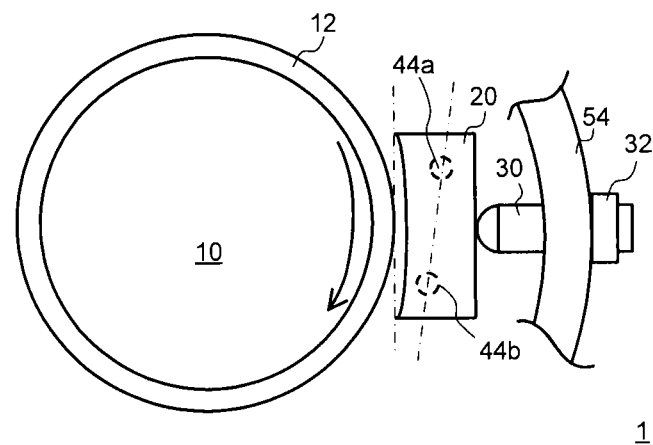
FIG. 5C is a plan view describing the disposition of the ball bearing in the guide bearing of the first embodiment.
Figure 5D:
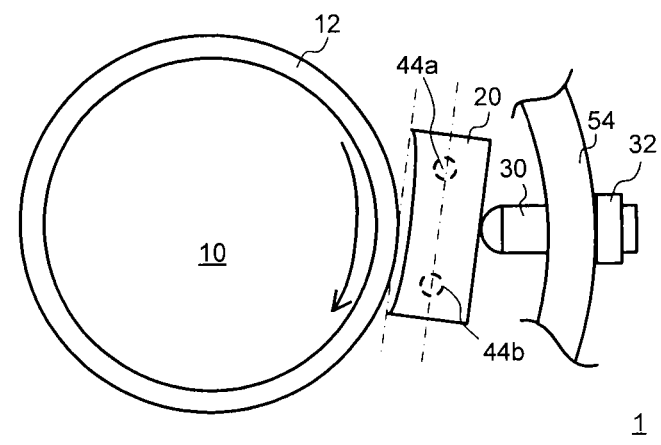
FIG. 5D is a plan view describing the disposition of the ball bearing in the guide bearing of the first embodiment.

As illustrated in FIG. 5A and FIG. 5B, the balls 44a and 44b of the ball bearing unit 40 of the embodiment are disposed on a straight line matching a tangential direction (tangential direction of the circumferential surface of the rotary shaft 10 at the intersecting point between an extension line of the adjusting bolt 30 and the circumferential surface of the rotary shaft 10) at a position corresponding to the center point of the bearing pad 20 in the circumferential direction of the rotary shaft 10. Alternatively, as illustrated in FIG. 5C and FIG. 5D, in a state that the bearing pad 20 is tilted so that a lubrication water outlet of the bearing pad 20 becomes a predetermined bearing gap, the balls 44a and 44b of the ball bearing unit 40 may be disposed on a straight line matching a tilting line direction connecting a lubrication water inlet and the lubrication water outlet of the bearing pad 20.

A dynamic pressure occurs when the rotary shaft 10 rotates and a relative speed difference occurs between the shaft skirt 12 and the bearing pad 20. Specifically, a wedge space in which upstream (lubrication water inlet) of the bearing pad 20 is wide and downstream (lubrication water outlet) is narrow in a plan view is formed, which applies a pressure to the water film in the bearing gap of the bearing pad 20 to generate a water film pressure. When a radial load acting on the rotary shaft 10 becomes large and the shaft tilting increases, the water film pressure is acted also on the bearing pad 20 to cause it to tilt so that the lubrication water inlet side widens. In this case, the bearing pad 20 tilts in a state that a wedge space is formed in the bearing gap (state of being tilted with respect to a tangential line at the intersecting point of the bearing center line and the rotary shaft). Considering them, a line connecting this tangential line and the top portions of the balls 44a and 44b of the ball bearing unit 40 may be in parallel as illustrated in FIG. 5A and FIG. 5B, or the disposition of the balls 44a and 44b of the ball bearing unit 40 may be given a tilt angle so that an angle equal to the angle corresponding to the angle formed by the wedge space is generated with respect to this tangential line on the line connecting the top portions as illustrated in FIG. 5C and FIG. 5D. When the tilt angle is provided, the bearing pad 20 can follow the shaft tilting more smoothly. Note that this tilt angle is a relatively small value of 0.06 degree to 0.16 degree in the example illustrated in FIG. 11.

(Modification Example of the Ball Bearing Unit)

Figure 6A:
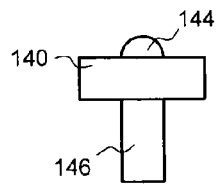
FIG. 6A is a view illustrating a modification example of the ball bearing in the guide bearing of the first embodiment.
Figure 6B:
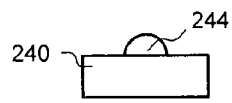
FIG. 6B is a view illustrating a modification example of the ball bearing in the guide bearing of the first embodiment.

In the guide bearing illustrated in FIGS. 1A and 1B, the ball bearing unit 40 having the balls 44a and 44b (or the balls 44a to 44c) is provided to support the bearing pad 20, but it is not restrictive. Instead of the ball bearing unit 40, as illustrated in FIG. 6A, a pin bearing unit 140 which has a fixing screw 146 and a top portion 144 formed in a spherical shape may be provided, or as illustrated in FIG. 6B, a pin bearing unit 240 which does not have the fixing screw 146 but has a top portion 244 formed in a spherical shape may be provided. That is, it will suffice if the end portion supporting the bearing pad 20 is formed in a spherical shape which has sufficient sliding characteristics. Note that the pin bearing units 140 and 240 may also be used as a ball bearing unit constituted of a support seat 38, a base 39a, and a ball 39b and a ball bearing unit constituted of a base 25 and a ball 26, which are illustrated in FIGS. 2A to 2C.

Figure 10:
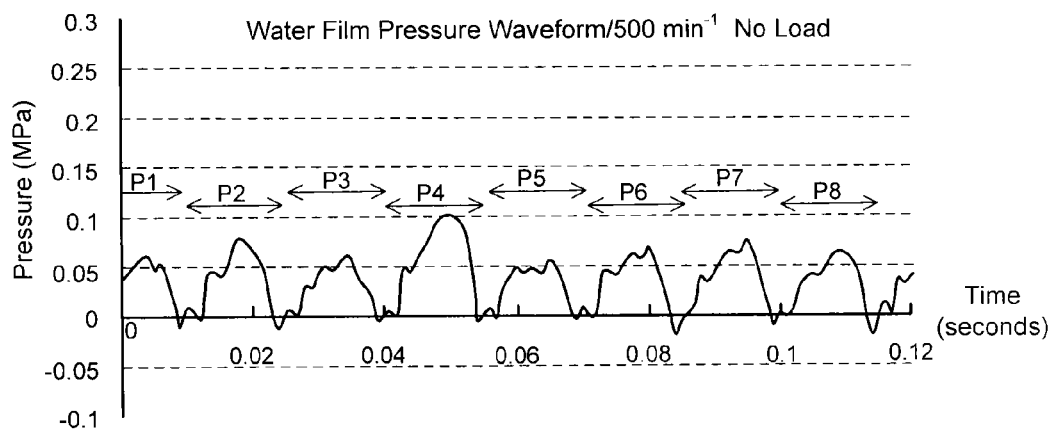
FIG. 10 is a diagram illustrating the state of occurrence of dynamic pressure occurring upon rotation without applying an axial load in a radial direction of a rotary shaft in the guide bearing of the first embodiment.
Figure 11:
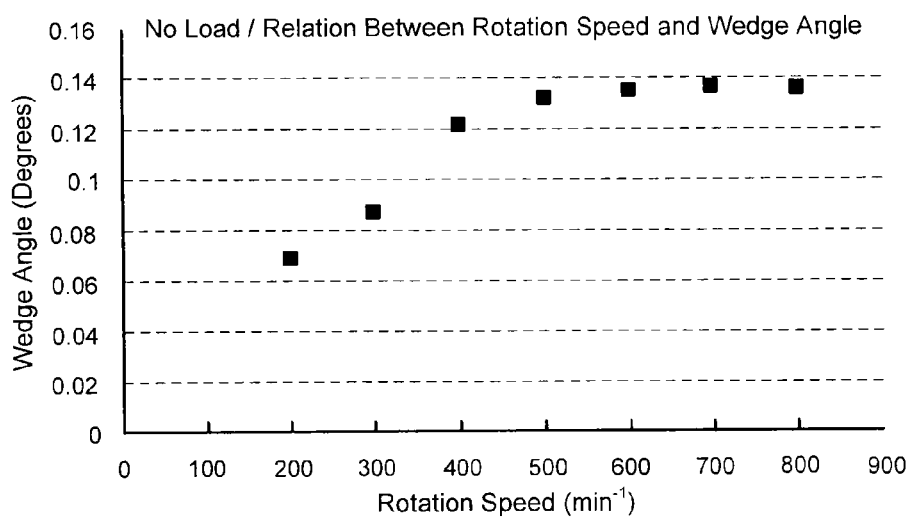
FIG. 11 is a diagram illustrating the relation between a rotation speed and a wedge angle of the bearing pad upon rotation without applying an axial load in a radial direction of the rotary shaft in the guide bearing of the first embodiment.
Figure 12:
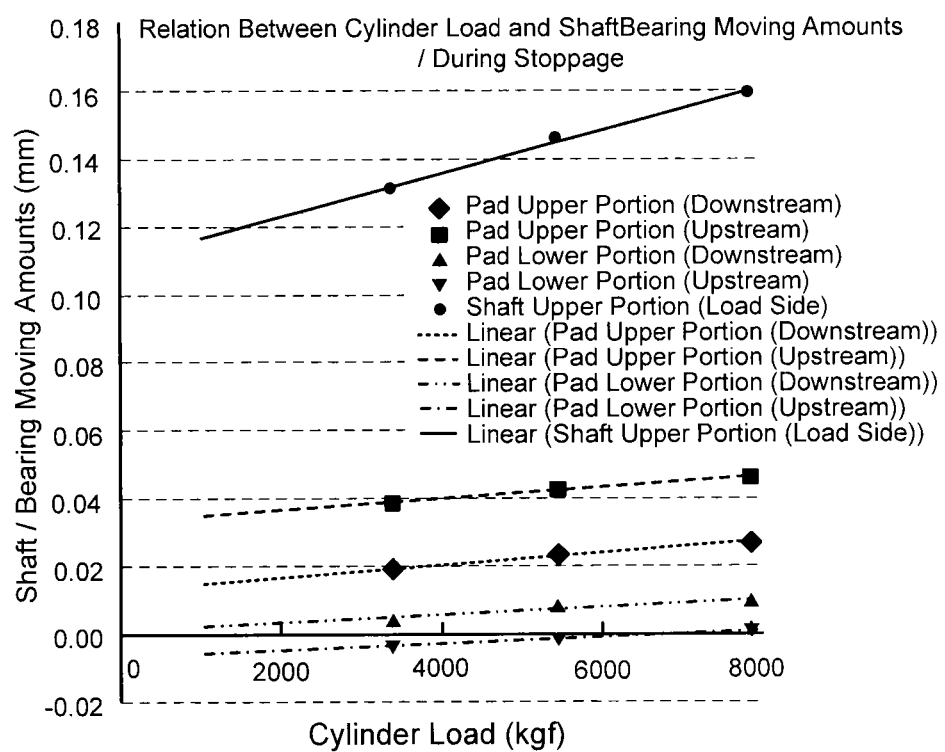
FIG. 12 is a diagram illustrating the relation between a load and a shaft and bearing pad moving amount upon pressing with a load against the shaft while the rotary shaft is in a stopped state in the guide bearing of the first embodiment.

FIG. 10 to FIG. 12 illustrate test results of confirming tilting followability in the case where the bearing pad 20 is supported using the pin bearing unit 140, 240. As illustrated in FIG. 10 to FIG. 12, also when the pin bearing unit 140, 240 is used, effects similar to those of the case where the ball bearing unit 40 is used to support the bearing pad 20 are obtained.

FIG. 10 illustrates water film pressures generated on eight bearing pads P1 to P8 (in the diagram, a valley-to-valley portion of an individual peak corresponds to the width of an individual bearing pad 20). In this test, with respect to the bearing pads P1 to P8, support by the ball bearing unit 40 and support by the pin bearing unit 140, 240 are mixed. As illustrated in FIG. 10, it can be seen that equal water film pressures are generated on all the bearing pads.

FIG. 11 illustrates the relation between a rotation speed of the bearing pad 20 supported by the pin bearing unit 140, 240 and the wedge angle. As illustrated in FIG. 11, it can be seen that when the dynamic pressure increases accompanying acceleration of rotation, the wedge angle increases in a corresponding manner and increases until reaching the structural limit, and thereafter this angle is maintained.

FIG. 12 is a diagram illustrating moving amounts of the bearing pad 20 supported by the pin bearing unit 140, 240 and the rotary shaft 10 in relation with a pressing load of the rotary shaft 10. As illustrated in FIG. 12, it can be seen that the moving amounts increase accompanying the increase of load for both the rotary shaft 10 (solid line in the diagram) and the bearing pad 20 (dotted line, dashed line, one-dot chain line, two-dot chain line). The moving amount of the rotary shaft 10 is large because the rotary shaft 10 moves by the amount of the bearing gap, and then the bearing pad 20 moves by pressing of the rotary shaft 10.

(Reinforcement of the Bearing Pad 20)

Figure 7A:
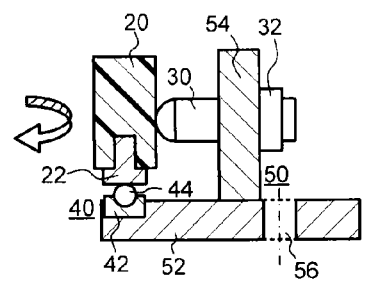
FIG. 7A is a view illustrating a modification example of the bearing pad in the guide bearing of the first embodiment.

Further, in the guide bearing illustrated in FIG. 1A and FIG. 1B, the balls of the ball bearing unit 40 abut directly on the bearing pad 20 to support the bearing pad 20, which is not restrictive. As illustrated in FIG. 7A, a support seat 22 formed of a hard material may be disposed in a portion opposing the balls 44 of the ball bearing unit 40 in the bearing pad 20, making the balls of the ball bearing unit 40 and the support seat 22 abut on each other. Further, instead of the support seat 22, the bottom surface of the bearing pad 20 may be treated by thermal spraying, plating, or the like, so as to harden the portion where the balls 44 of the ball bearing unit 40 abut on. Thus, it is possible to prevent abrasion of the bearing pad 20, and follow the shaft tilting smoothly.

The bottom surface portion of the bearing pad 20 transmits empty weight of the bearing pad 20 and a vertical component of the bearing load to ball top portions of the ball bearing unit 40, and thus a contact surface on this bottom face portion becomes high. Accordingly, the bottom surface portion may plastically deform over time, and a recess on the spherical surface corresponding to the ball may be formed. When a recess is formed in the bottom surface of the bearing pad 20, the support position of the bearing pad 20 lowers in the vertical direction, and thereby it is possible that the bearing pad deviates from a proper bearing pad position, making it unable to exhibit the role of bearing with respect to vertical vibrations. Further, the contact area between the bearing pad 20 and the ball top portions of the ball bearing unit 40 increases, and thus abrasion of the bearing pad 20 increases. As a result, movement of the bearing pad 20 is also affected, and formation of the wedge space becomes insufficient, decreasing the bearing performance. Moreover, the possibility of leading to increase in shaft vibration or the like also increases.

The support seat 22 prevents such lowering of position of the bearing pad 20. Specifically, by increasing hardness of the bottom portion (contact portion with the balls of the ball bearing unit 40) of the bearing pad 20, occurrence of the recess in the bottom surface of the bearing pad 20 can be suppressed, so as to maintain the bearing performance.

Figure 7B:
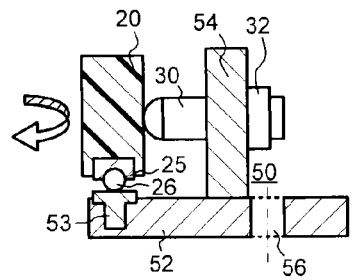
FIG. 7B is a view illustrating a modification example of the bearing pad in the guide bearing of the first embodiment.

Note that in the example illustrated in FIG. 7A, the ball bearing unit 40 is disposed on the disc 52 of the bearing support stand 50 and the support seat 22 is provided on the bottom portion of the bearing pad 20, but it is not restrictive. As illustrated in FIG. 7B, a ball bearing unit constituted of the base 25 and the ball 26 may be disposed in the bottom portion of the bearing pad 20, and a support seat 53 may be provided in a portion in the disc 52 on which the ball 26 abuts. Similarly, instead of the support seat 53, the portion in the disc 52 on which the ball 26 abuts may be treated by thermal spraying, plating, or the like, so as to harden the portion on which the ball 26 abuts. Note that the support seats 22 and 53 constituted of a hard material may be disposed in an end portion of the adjusting bolt 30a illustrated in FIGS. 2A and 2B, or an outer circumferential side (position where the end portion of the adjusting bolt 30 abuts) of the bearing pad 20 illustrated in FIG. 2C.

(Other Methods for Supporting the Bearing Pad)

Figure 8A:
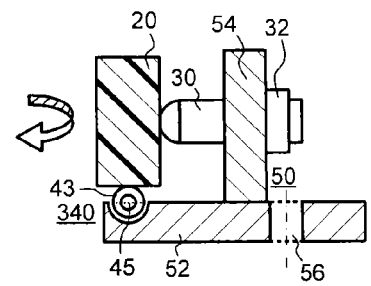
FIG. 8A is a vertical cross-sectional view describing a modification example of the ball bearing in the guide bearing of the first embodiment.
Figure 8B:
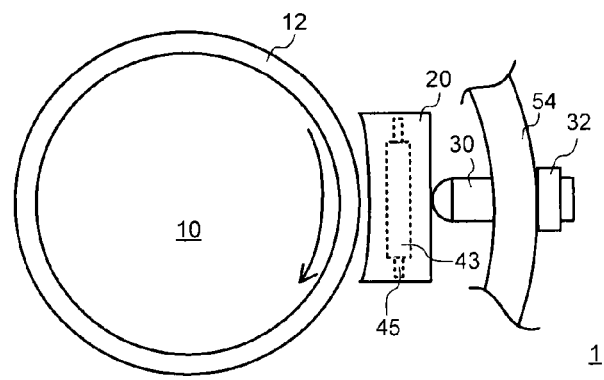
FIG. 8B is a plan view describing the modification example of the ball bearing in the guide bearing of the first embodiment.
Figure 8C:
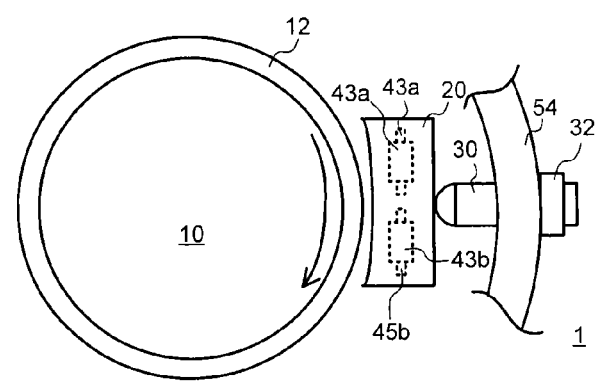
FIG. 8C is a plan view describing a modification example of the ball bearing in the guide bearing of the first embodiment.

Moreover, in the guide bearing illustrated in FIGS. 1A and 1B, the ball bearing unit 40 having the balls 44a and 44b (or balls 44a to 44c) is provided to support the bearing pad 20, but it is not restrictive. Instead of the ball bearing unit 40 in which the bearing pad 20 is supported by balls, a roller bearing unit 340 in which a cylindrical roller 43 is supported by a shaft 45 may be provided as illustrated in FIG. 8A and FIG. 8B. The roller of the roller bearing unit 340 is disposed in parallel to the tangential direction at the position corresponding to the center point of the bearing pad 20 in the circumferential direction of the rotary shaft 10. A plurality of rollers of the roller bearing unit 340 may be provided as illustrated in FIG. 8C. That is, the supporting mechanism which supports the bearing pad 20 can exhibit the same effect as long as it is structured rotatably and slidably using a member whose abutting surface is formed in a curved surface shape.

The bearing pad 20 and the roller 43 of the roller bearing unit 340 are in line contact, but the bearing pad 20 can slide on a top portion line of the roller 43 to form a wedge. Further, the bearing pad can pivot on the roller 43 to tilt accompanying shaft tilting, and thus can exhibit bearing performance equivalent to those when the bearing pad 20 is supported using the ball bearing unit 40. Since the wedge angle is generally small (see FIG. 11) and the roller 43 rotates about the shaft 45, the wedge space can be formed easily. Further, by dividing the roller into plural rollers such as the rollers 43a and 43b as illustrated in FIG. 8C, it becomes also possible that the rollers 43a and 43b rotate in reverse to each other, and the wedge space can be formed more rationally.

Figure 9A:
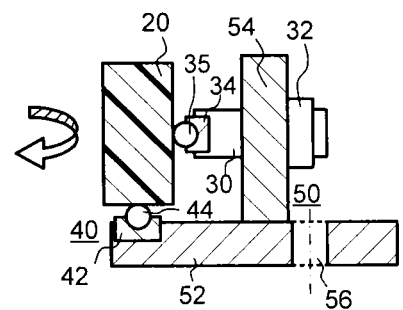
FIG. 9A is a vertical cross-sectional view illustrating a modification example of an adjusting bolt in the guide bearing of the first embodiment.
Figure 9B:
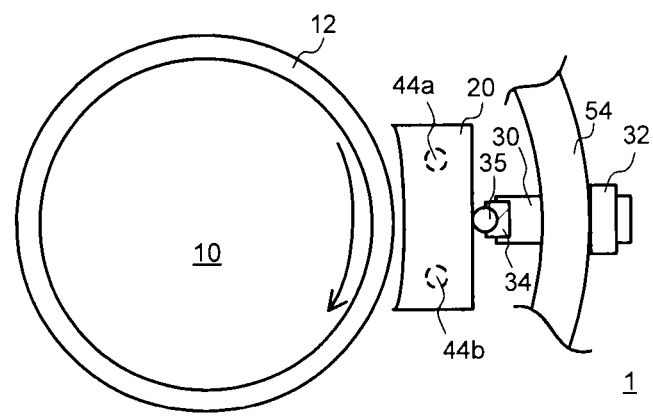
FIG. 9B is a plan view illustrating the modification example of an adjusting bolt in the guide bearing of the first embodiment.

Further, in the guide bearing illustrated in FIGS. 1A and 1B, the bearing pad 20 is supported from the outer circumferential side by the adjusting bolt 30 with a tip portion having a spherical shape, but it is not restrictive. As illustrated in FIG. 9A and FIG. 9B, a ball bearing mechanism constituted of a base 34 as a base portion and balls 35 disposed in holes formed in the base 34 may be provided on the tip portion of the adjusting bolt 30. Specifically, the bearing pad 20 can be supported from the outer circumferential side by the balls 35 of this ball bearing mechanism. That is, the supporting mechanism which supports the bearing pad 20 can exhibit the same effect as long as it is structured rotatably and slidably using a member whose abutting surface is formed in a curved surface shape.

In the example illustrated in FIG. 9A and FIG. 9B, since the support from below and the support from the outer circumferential side for the bearing pad 20 are both performed via balls having a small frictional force, wedge space formation and followability to the shaft tilting by the bearing pad 20 can be realized by a smaller force. Specifically, when the operating state of the hydraulic wheel varies and a change in the bearing load and a change in the shaft tilting occur, the wedge angle increases or decreases and the shaft tilting angle increases or decreases, changing the contact position between the bearing pad 20 and the adjusting bolt 30. Accordingly, by providing the ball bearing mechanism having the balls 35 in the tip of the adjusting bolt 30, the frictional force at the contact portion can be decreased, and a position change of the bearing pad 20 can be performed smoothly and quickly.

(Details of Operation of the First Embodiment)

Next, with reference to FIG. 1 to FIG. 16, operation of the guide bearing of the first embodiment will be described. When the rotary shaft 10 starts to rotate, the lubrication water adhering to the shaft skirt 12 by viscosity enters the sliding surfaces (bearing gap) of the shaft skirt 12 and the bearing pad 20 to form a water film. The guide bearing of the hydraulic machine generates a water film pressure by such relative movement between the rotary shaft 10 and the bearing pad 20, and supports the load acting on the bearing pad 20 by this water film pressure (fluid pressure). When the water film pressure of the bearing gap can be increased, a large bearing load can be pivotally supported. Thus, easiness in creation and retention stability of the wedge space shape by the bearing pad 20 are increased by devising a dimensional relation between the outer diameter of the shaft skirt 12 and the inner diameter of the bearing pad 20, or by devising a support position by the adjusting bolt 30 with respect to the width of the bearing pad 20.

When the rotary shaft 10 is rotated, the lubrication water sticking to the shaft skirt 12 is drawn into the sliding surface of the bearing pad 20 and is further drawn into a tapered space in a wedge-like space, and thus a pressure is generated in the fluid. This wedge effect generating a water film pressure is known to be higher as the rotation speed becomes higher.

A test device in which the outer diameter of the shaft skirt 12 is $\phi 500$ and eight bearing pads 20 are disposed on the circumferential surface of the shaft skirt 12 was used to perform a test with the rotation speed of the rotary shaft 10 being 500 $min^{-1}$ without applying a radial load to the rotary shaft 10. An example of measuring a water film pressure of the center portion in the height direction of the bearing pad 20 at the shaft skirt 12 is illustrated in FIG. 10. In FIG. 10, P1 to P8 correspond to the eight bearing pads. As illustrated in FIG. 10, in this test, how the shaft skirt 12 receives water film pressures from the eight bearing pads P1 to P8 is illustrated, and it can be seen that the shaft skirt 12 receives substantially even water film pressures from the bearing pads.

Further, in the common test environment, a not-illustrated gap sensor is disposed on the bearing pad 20, and results of measuring the tilt angle of the bearing pad 20 when the rotary shaft 10 is rotated are illustrated in FIG. 11. As illustrated in FIG. 11, accompanying increase in rotation speed of the rotary shaft 10, the bearing pad 20 receives a water film pressure, and a wedge angle (tilt angle) formed by the bearing gap of the bearing pad 20 becomes large according to the rotation speed. On the other hand, it can be seen that when a certain rotation speed (400 $min^{-1}$ in the example illustrated in FIG. 11) is exceeded, the wedge angle settles substantially constant.

Incidentally, when a large radial load acts on a runner (not illustrated) in the case where the operating state of the hydraulic wheel changes, this load is transmitted to the bearing pad 20 via the rotary shaft 10. This radial load causes the rotary shaft 10 to elastically deform, and there occurs shaft tilting originated in a thrust bearing (not illustrated) pivotally supporting weight of the runner (not illustrated) and the rotary shaft 10 and a thrust load acting on the runner (not illustrated).

Figure 30A:
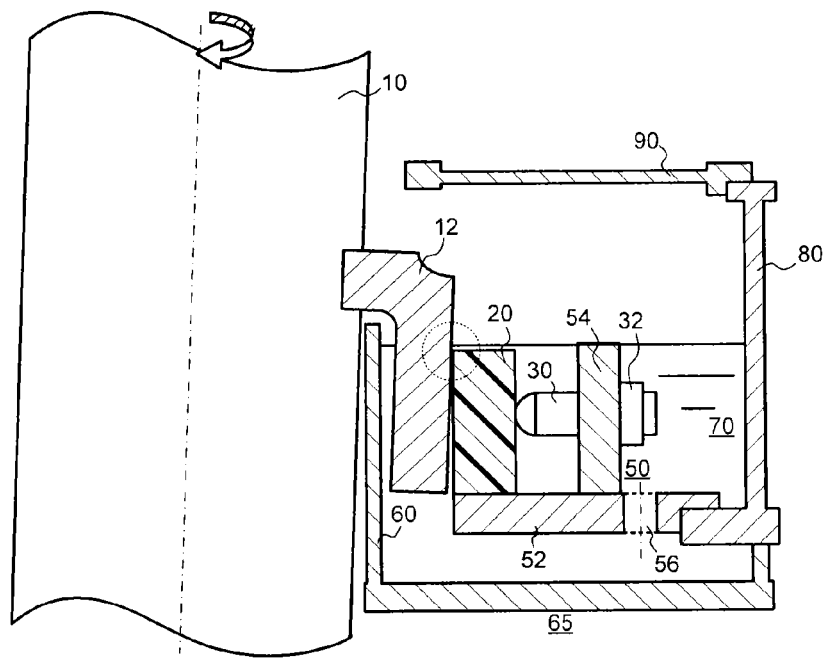
FIG. 30A is a vertical cross-sectional view of a guide bearing of a conventional structure.
Figure 30B:
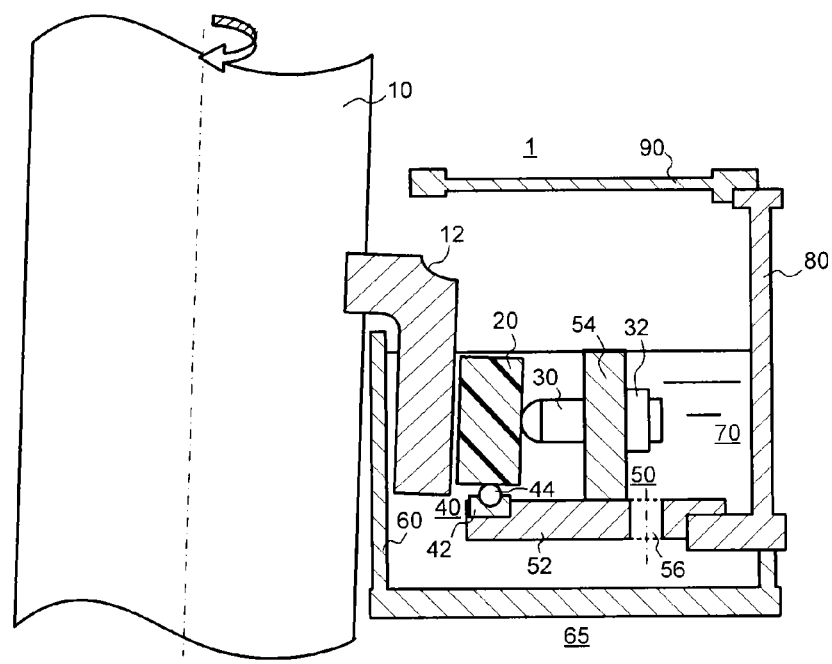
FIG. 30B is a vertical cross-sectional view of a guide bearing of an embodiment.

FIG. 30A is a vertical cross-sectional view of a guide bearing having a conventional structure which does not have the ball bearing unit 40, and FIG. 30B is a vertical cross-sectional view of a guide bearing of the embodiment. As illustrated in FIG. 30A, in the guide bearing having the conventional structure, since the bearing pad 20 is supported directly by surface contact on the disc 52 of the bearing support stand 50, the end portion of the bearing pad 20 is brought into uneven contact with the shaft skirt 12 when shaft tilting of the rotary shaft 10 occurs. This can cause a bearing seizure in the worst case. It is known that, in the case of water lubrication, since the viscosity of the lubricant is low as compared to oil lubrication, the thickness of a water film becomes thinner than that of oil under the same lubrication conditions, and the uneven contact state can be made easily.

On the other hand, as illustrated in FIG. 30B, in the guide bearing 1 of the embodiment, the bearing pad 20 is supported by point contact support by the ball bearing unit 40 or the pin bearing unit 140, 240 or line contact support by the roller bearing unit 340, and thus high followability can be obtained even when shaft tilting of the rotary shaft 10 occurs.

Here, the shaft tilting of the rotary shaft 10 and the followability of the bearing pad 20 will be described in detail. FIG. 12 illustrates movements of the rotary shaft 10 and the bearing pad 20 when the bearing pad 20 is supported by the pin bearing unit 140, 240, the rotary shaft 10 is in a stopped state, and the rotary shaft 10 is pressed against the bearing pad 20 by a hydraulic cylinder (not illustrated). As illustrated in FIG. 12, the rotary shaft 10 elastically deforms by the amount corresponding to the bearing gap and then contacts the bearing pad 20, and thus the value of the shaft movement amount (solid line in the diagram) of the rotary shaft 10 is larger than the value of the moving amount of the bearing pad 20. However, it can be seen that tilts of the rotary shaft 10 and the bearing pad 20 (a tilt of solid line and tilts of dashed line, dotted line, one-dot chain line, two-dot chain line in the diagram) are substantially equal, and the bearing pad 20 is following the tilt of the rotary shaft 10. The pin bearing unit 140, 240 has a large friction coefficient than the ball bearing unit 40, and thus it can be easily inferred that use of the ball bearing unit 40 presents such followability.

The balls of the ball bearing unit 40 pivot in all directions by a small frictional force, and hence can quickly respond to wedge formation according to a water film pressure and tilt support of the bearing pad 20 with respect to shaft tilting. Here, it is the adjusting bolt 30 that becomes the fulcrum for wedge formation and shaft tilting, and the bearing pad 20 can form an optimal wedge space by sliding on the ball bearing unit 40. Further, the bearing pad 20 pivots about a line connecting the top portions of the plurality of balls of the ball bearing unit 40 to keep itself parallel to the rotary shaft 10, and hence enables to constantly exhibit excellent bearing performance. That is, the ball bearing unit 40 is a mechanism for pivoting and tilting the bearing pad 20, and the adjusting bolt 30 acts as a fulcrum at that time. The adjusting bolt 30 acts to set and maintain the bearing gap in addition to this operation of fulcrum.

Figure 13A:
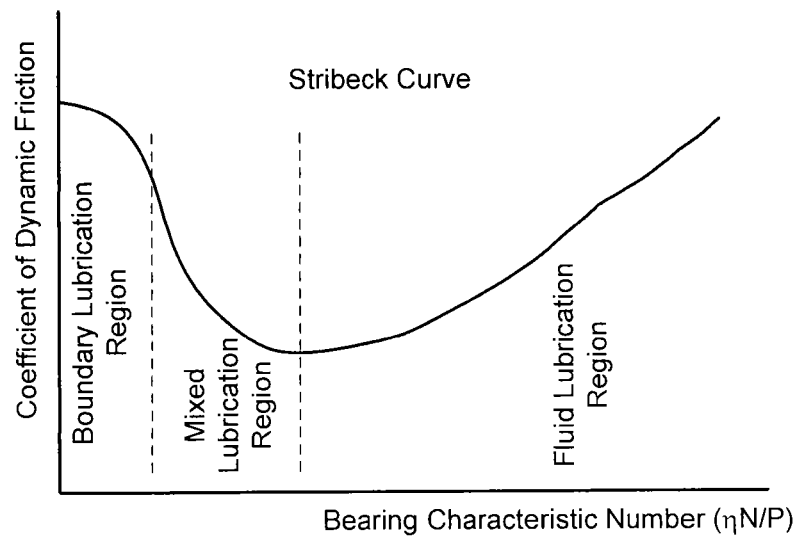
FIG. 13A is a diagram illustrating a Stribeck curve representing a lubrication state of the bearing when a bearing characteristic number is taken on the horizontal axis, and a coefficient of dynamic friction is taken on the vertical axis.
Figure 13B:
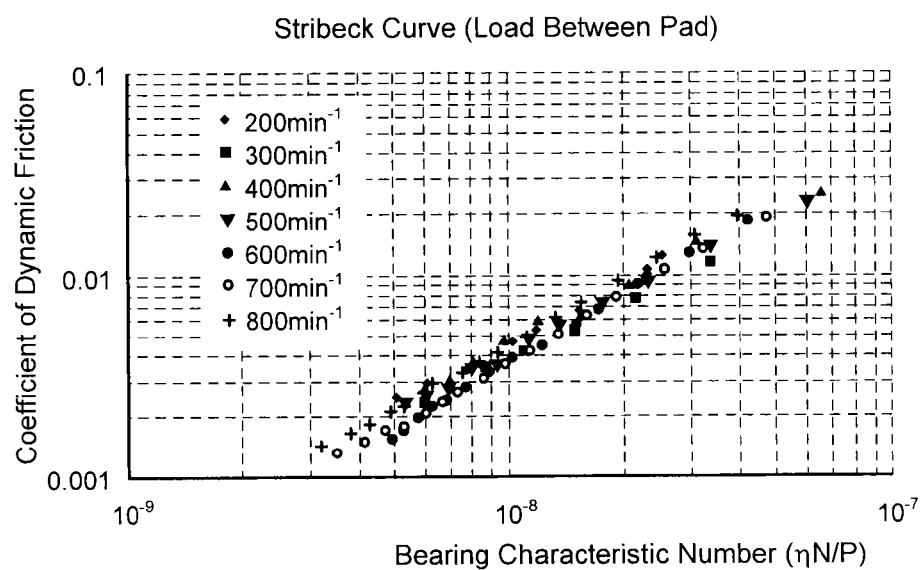
FIG. 13B is a diagram illustrating a Stribeck curve in the guide bearing of the first embodiment.
Figure 14A:
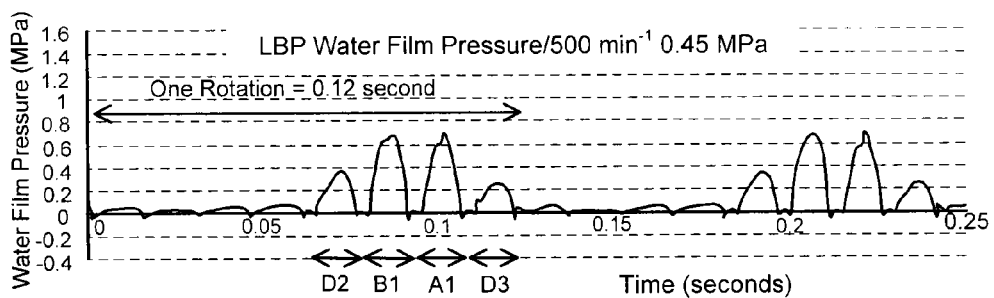
FIG. 14A is a diagram illustrating variations of water film pressure when a bearing average surface pressure is varied at the same rotation speed in the guide bearing of the first embodiment.
Figure 14B:
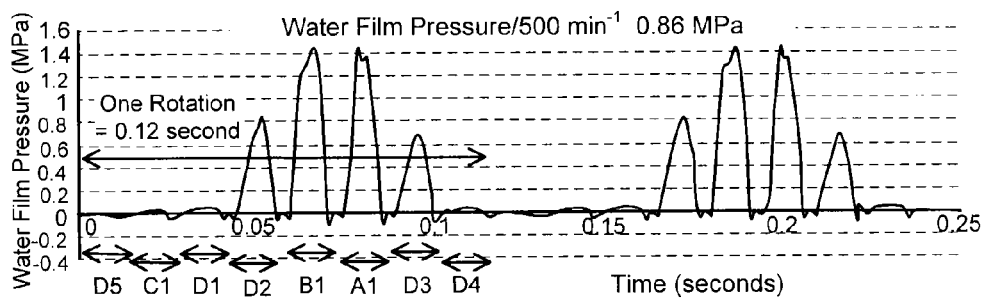
FIG. 14B is a diagram illustrating variations of water film pressure when the bearing average surface pressure is varied at the same rotation speed in the guide bearing of the first embodiment.
Figure 15A:
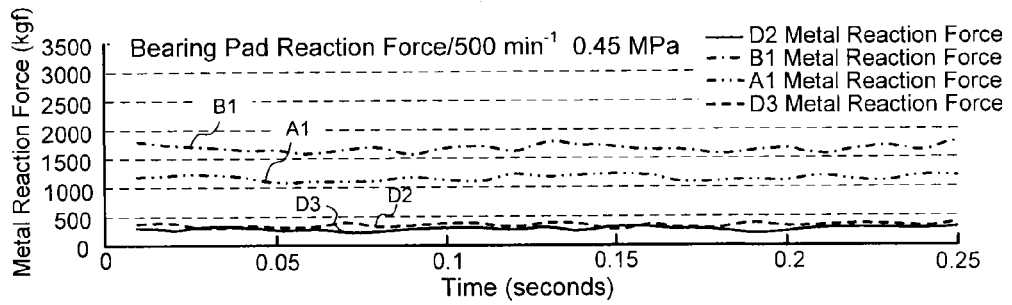
FIG. 15A is a diagram illustrating a load in a radial direction acting on the bearing pad in FIG. 14A.
Figure 15B:
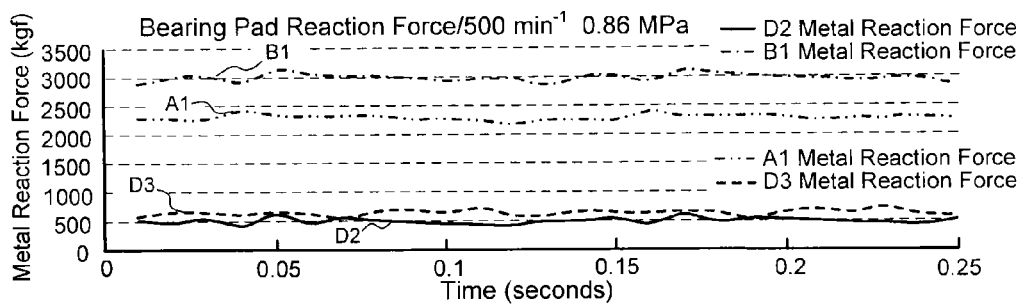
FIG. 15B is a diagram illustrating a load in a radial direction acting on the bearing pad in FIG. 14B.

Next, characteristic examples of the guide bearing of the embodiment will be described. FIG. 13A illustrates a Stribeck curve which appears when a bearing characteristic number $\eta N/P$ ($\eta$: viscosity of water [Pa·s], N: rotation speed per second [$s^{-1}$], P: bearing surface pressure [Pa]) or Sommerfeld number $\eta N/P (R/C)^2$ (R: bearing radius [mm], C: bearing radius gap [mm]) is taken on the horizontal axis, and a coefficient of dynamic friction is taken on the vertical axis. FIG. 13B illustrates a specific example of the Stribeck curve.

In FIG. 13A, a fluid lubrication region in which the coefficient of dynamic friction decreases as the bearing characteristic number or the Sommerfeld number becomes small from a large number is in an ideal lubrication state in which sliding surfaces (bearing gap) of the shaft skirt 12 and the bearing pad 20 are completely separated by a water film. Moreover, as the bearing characteristic number or the Sommerfeld number decreases, the water film in the bearing gap becomes thin, and a mixed lubrication region is formed in which lubrication is performed while a contact between projecting portions of the sliding surfaces with each other occurs locally. As the bearing characteristic number or the Sommerfeld number decreases further, a boundary lubrication region is formed in a lubrication state such that a contact between the projecting portions of the sliding surfaces with each other occurs. When the fluid lubrication state is maintained in any operating condition, it is a bearing which excels in bearing performance and lifetime.

FIG. 13B illustrates test results of checking a lubrication state with the rotation speed and surface pressure being parameters for the guide bearing of the embodiment. As illustrated in FIG. 13B, it can be seen that all data obtained as results of the test indicate a fluid lubrication state in which the coefficient of dynamic friction decreases as the bearing characteristic number decreases.

Further, FIG. 14A to FIG. 15B illustrate results of testing a water film pressure distribution and a bearing reaction force in a center portion of the bearing pad when the bearing load is increased at a certain rotation speed. As illustrated in FIG. 14A to FIG. 15B, it can be seen that a structure is built in which when a load to the rotary shaft 10 increases, bearing surface pressures of bearing pads A1, B1 generating a maximum axial bearing pressure and bearing pads D2, D3 on both ends thereof increase, and a large axial load can be retained by the entire bearing.

Thus, in the guide bearing of the embodiment, since the bearing pad is supported for example by a curved surface shape such as a spherical surface or a cylindrical shape, the wedge space of the bearing pad can be formed smoothly and the shaft tilting followability can be increased, and thus increase in bearing load capacity and safe operation of the bearing become possible.

Second Embodiment

Next, a second embodiment will be described in detail with reference to FIG. 17 to FIG. 21. A guide bearing 2 of the second embodiment actively circulates the lubrication water in the guide bearing 1 of the first embodiment. In the following description, elements common to the first embodiment are designated by common references, and duplicated descriptions are omitted.

Figure 17:
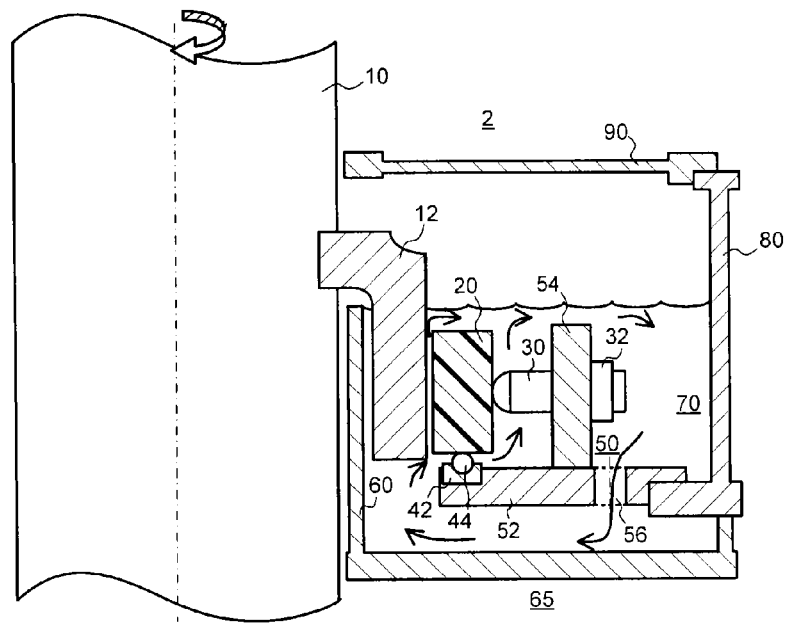
FIG. 17 is a vertical cross-sectional view illustrating the structure of a guide bearing of a second embodiment.

As illustrated in FIG. 17, the guide bearing 2 of this embodiment is supported on a circumferential edge portion of the rotary shaft 10 by a bearing stand 80 having a wall surface coaxial with the circumferential edge surface and by a bearing support stand 50 provided to extend toward the rotary shaft 10 from the wall surface of the bearing stand 80. A water cylinder 60 is disposed below the guide bearing 2, and the guide bearing 2 is housed in a water tank 65 constituted of the water cylinder 60 and the bearing stand 80. The water tank 65 is formed along the circumferential surface of the rotary shaft 10, houses the guide bearing 2, and stores water 70 as a lubricant. Further, an upper surface of the water tank 65 is covered with a bearing cover 90.

A shaft skirt 12 guided from the inner circumferential side wall surface of the water tank 65 into the water tank 65 is sandwiched between the inner circumferential side wall surface of the water tank 65 and a bearing pad 20. The bearing pad 20 is retained by the bearing support stand 50, and in slide contact with an outer circumferential surface of the shaft skirt 12 of the rotary shaft 10 via the water 70. The bearing support stand 50 has a donut-shaped disc 52 formed coaxially with the rotary shaft 10 and supporting the bearing pad 20 from below (thrust direction), and a ring plate 54 disposed on the disc 52 and supporting the bearing pad 20 from the radial direction (outer circumferential direction). In the disc 52, a hole 56 is formed on an outer circumferential side of the ring plate 54. The water tank 65 is separated into an upper layer and a lower layer with the disc 52 being interposed therebetween, and the upper layer of the water tank 65 is separated into an inner layer and an outer layer with the ring plate 54 being interposed therebetween. The hole 56 formed in the disc 52 communicates the upper layer and the lower layer of the water tank 65.

(Bearing Pump Operation)

In the case of oil-lubricated bearing using oil as a lubricant, it is known that a bearing loss constituted of a friction loss, a mixing loss, and/or the like is large compared to a water-lubricated bearing since viscosity of oil is higher than that of water. Accordingly, measures are taken such as, for example, setting the amount of stored lubrication oil not for dipping entirely up to the bearing top portion but for dipping up to about the bearing center (to the degree that the bearing performance is not affected) to suppress the amount of heating, and boring a through hole in a disc or a ring plate dividing the storage portion into upper and lower portions and making the lubrication oil to circulate therethrough so as to increase cooling effect.

On the other hand, in the case of water-lubricated bearing, viscosity of the lubrication water is about one several tenths of oil, and a friction loss due to water passing the bearing pad 20 is small as compared to the case where oil is used. That is, the lift amount of water through the bearing pump operation by the shaft skirt 12 and the bearing pad 20 is large compared to the case of oil-lubricated bearing. This lift amount of water through the bearing pump operation increases as the rotation speed of the rotary shaft 10 increases. Results of testing such bearing pump operation are illustrated in FIG. 21.

Figure 21:
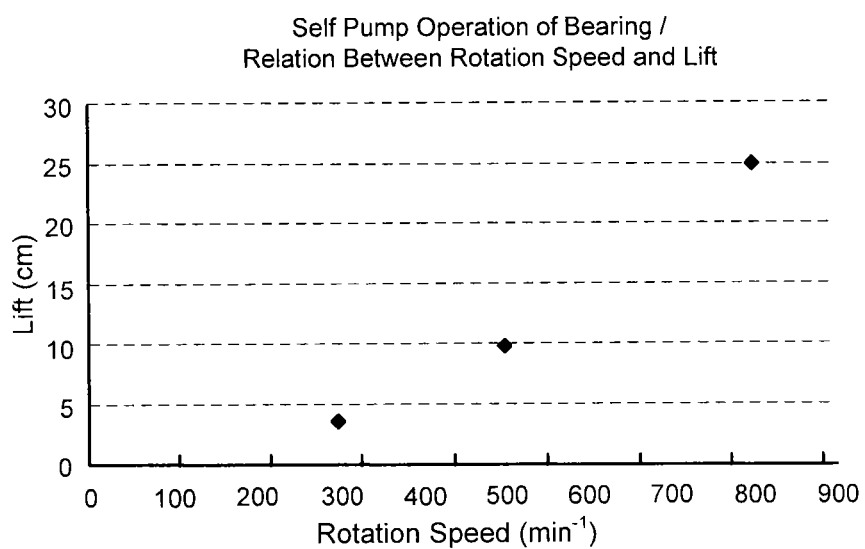
FIG. 21 is a diagram describing a self pump operation of the bearing in the guide bearing of the second embodiment.

As illustrated in FIG. 17 and FIG. 21, when the rotary shaft 10 is rotated, the bearing pump operation by the shaft skirt 12 and the bearing pad 20 works, and water 70 pushed out via the bearing gap of the bearing pad 20 is sent to the lower layer of the disc 52 via the hole 56 from the upper layer of the disc 52. That is, when the hole 56 penetrating the disc 52 is formed in the outer circumferential side of the ring plate 54, the water 70 circulates from the upper layer of the water tank 65 to the lower layer, and from the lower layer to the upper layer. Besides that, the water 70 located on the outside of the ring plate 54 of the water cylinder 60 passes the hole 56, part thereof being drawn to the inside of the ring plate 54, and the remaining part being drawn into the bearing gap of the bearing pad 20 and the shaft skirt 12 and then discharged to an upper space via the top portion of the bearing pad 20. In the guide bearing 2 of this embodiment, since such a circulation system is built, insufficiency of lubrication water around the bearing pad 20 can be prevented, and stable lubrication characteristics can be secured.

(Height of the Bearing Pad and the Ring Plate)

Figure 18:
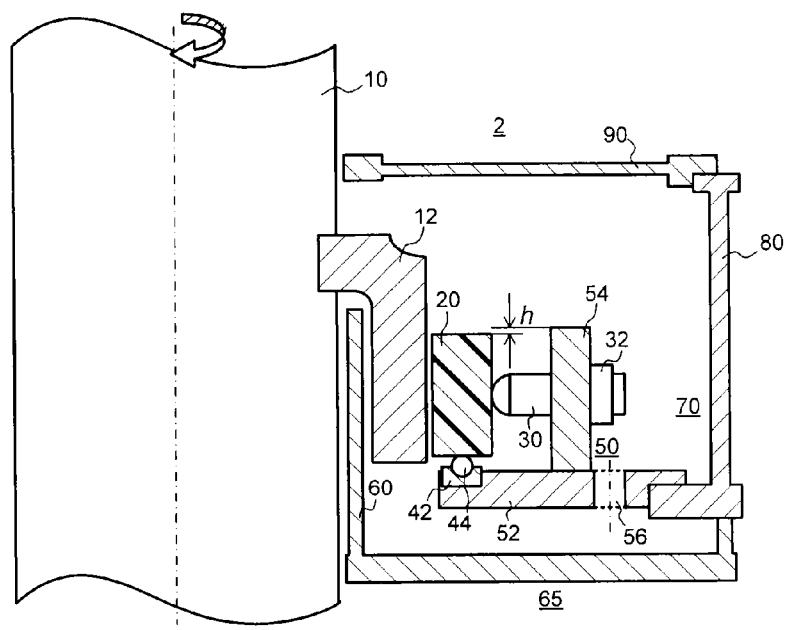
FIG. 18 is a vertical cross-sectional view describing a bearing pad in the guide bearing of the second embodiment.

As illustrated in FIG. 18, in the guide bearing 2 of this embodiment, a height difference h is provided between the top portion of the bearing pad 20 and a top portion of the ring plate 54 disposed on the outer circumferential side of the bearing pad 20. That is, the top portion of the ring plate 54 is structured to be higher by the height difference h than the top portion of the bearing pad 20. By such a structure, the water 70 which exceeded the upper surface of the bearing pad 20 is collected by the ring plate 54, and the lubrication water can be guided to an inner circumferential side of the ring plate 54.

Here, the top portion of the ring plate 54 is structured to be higher by 0 mm to 10 mm than a normal water level of the water 70 as lubrication water. In such a state, the entire bearing pad 20 is surely dipped in the water 70, and thus a lubrication failure due to insufficient lubrication water can be prevented. In particular, when the water level in the water tank 65 lowers due to water leakage or evaporation, the water level of the inner circumferential side of the ring plate 54 due to the bearing pump operation becomes higher than the water level of the outer circumferential side thereof, and thus it is advantageous in terms of lubrication characteristics.

(Means for Circulating the Lubrication Water)

Figure 19A:
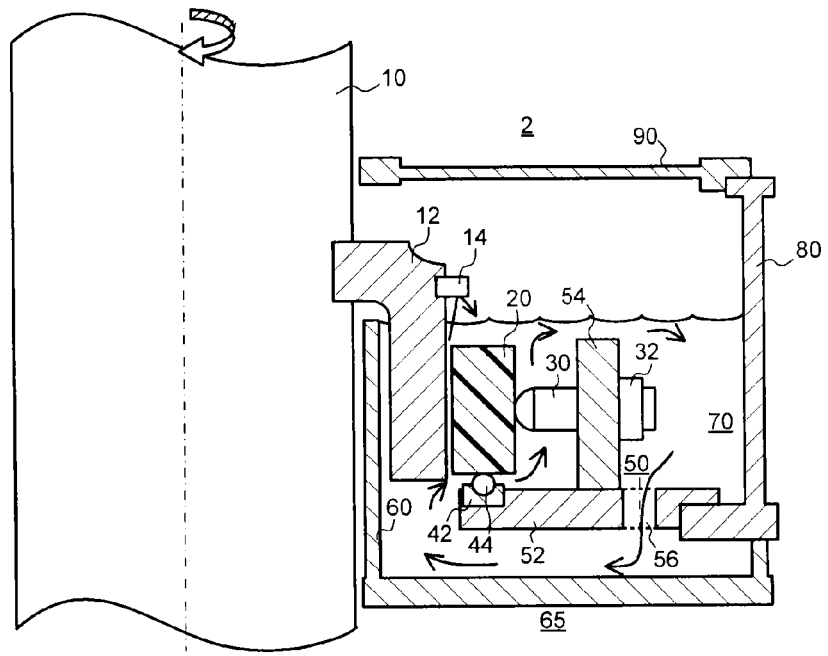
FIG. 19A is a vertical cross-sectional view illustrating a modification example of a shaft skirt in the guide bearing of the second embodiment.
Figure 19B:
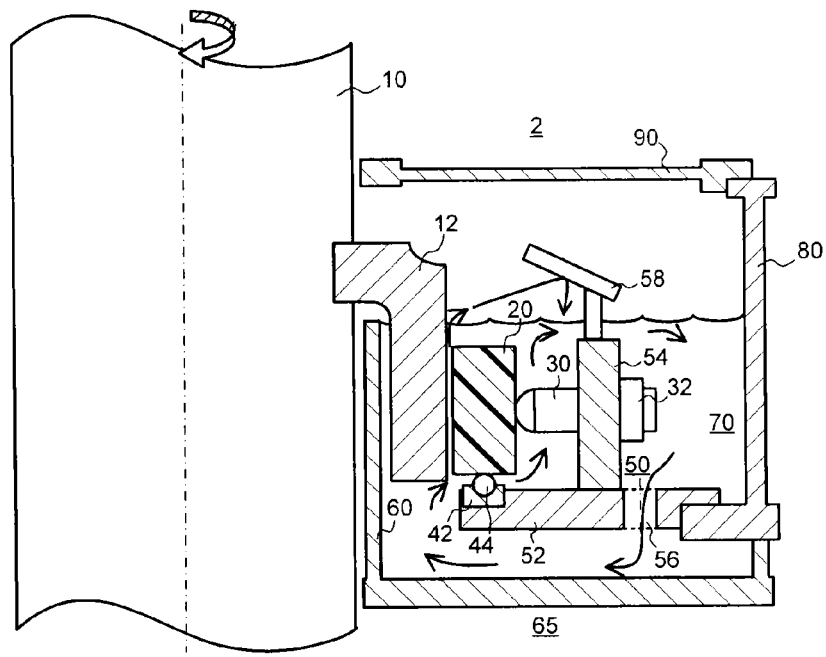
FIG. 19B is a vertical cross-sectional view illustrating a modification example of a bearing support stand in the guide bearing of the second embodiment.

As illustrated in FIG. 19A, a sealing ring 14 may be formed between a bending portion in the shaft skirt 12 and an opposing surface of the bearing pad 20, so as to return the water 70 spattered upward of the bearing pad 20 to the inner circumferential side of the ring plate 54. Further, as illustrated in FIG. 19B, a water drip plate 58 which returns the water 70 spattered from the bearing pad 20 to the inner circumferential side of the ring plate 54 may be formed on the top portion of the ring plate 54. When the rotation speed of the rotary shaft 10 is high, the bearing pump operation is large, and when gushing water is released from the top portion of the bearing pad 20, it collides with the bearing cover 90 and the like and the gushing water falls down to the outer circumferential side of the ring plate 54. The sealing ring 14 illustrated in FIG. 19A and the water drip plate 58 illustrated in FIG. 19B can guide such gushing water to the inner circumferential side of the ring plate 54. That is, the gushing water is not returned to the lower layer of the water tank 65 but can be returned directly to the inner circumferential side of the ring plate 54. By returning the water 70 directly to the inner circumferential side of the ring plate 54 which is in direct contact with the bearing pad 20, it is possible to prevent occurrence of lubrication failure when an abnormal event of water level decrease occurs.

(Setting Example of the Bearing Gap)

Figure 20:
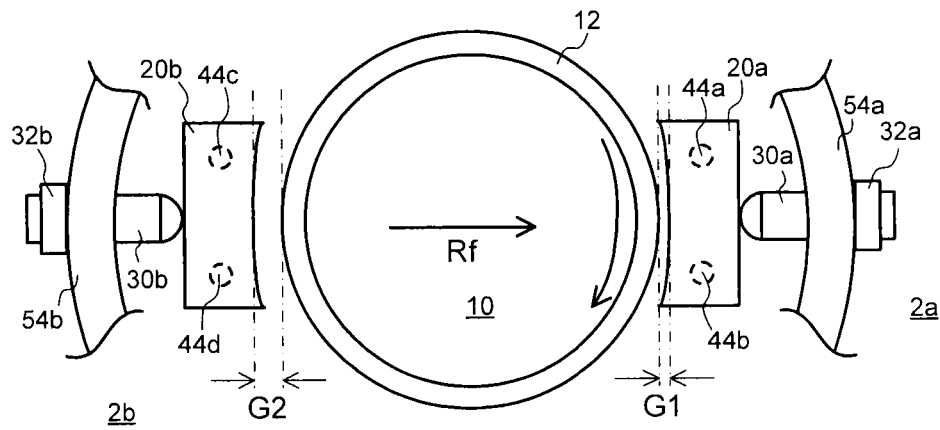
FIG. 20 is a plan view describing a bearing gap of the bearing pad in the case where the guide bearing of the second embodiment is applied to a Pelton wheel of one-jet operation.

Next, a specific example of applying the guide bearing 2 of the second embodiment to a Pelton wheel will be described. FIG. 20 is a view illustrating an example of applying the guide bearing 2 to a Pelton wheel.

As illustrated in FIG. 20, in a Pelton wheel which performs one-jet operation, guide bearings 2a and 2b are disposed to oppose each other across the rotary shaft 10. Then, a bearing gap G1 of a bearing pad 20a supporting a radial load is set to the value of a normal design value, and a bearing gap G2 of an anti-radial load side bearing pad 20b located on an opposing surface of the bearing pad 20a is set wider than the value of a normal design value.

As illustrated in FIG. 20, in one-jet operation of the Pelton wheel, a nozzle used is determined and thus a direction Rf of the radial load is determined naturally. In the case of such an operating state, the bearing pad 20b opposing the bearing pad 20a pivotally supporting the load generates a dynamic pressure but does not pivotally support the load, and hence is in a free state as a bearing. In a Newtonian fluid, a frictional force is proportional to the product of viscosity of lubricant, rotation speed of the shaft, and bearing area, and is inversely proportional to the bearing gap. Therefore, by setting the bearing gap G2 of this bearing pad 20b to about 2 to 4 times the normal design value, the bearing frictional force on the bearing pad 20b can be decreased, and the lift amount of water by the bearing pump operation can be increased.

As a result of performing a test with the bearing gap G2 being set to four times the normal set value, it has been recognized that a jet flow gushes out vigorously from the upper end of the bearing pad 20b as compared to the bearing gap of the design value. That is, since the bearing pump operation improves, the water level around the bearing pad 20b increases, and occurrence of lubrication failure can be prevented when an abnormal event of water level decrease occurs. When there is a concern of increase in shaft vibrations by increasing the bearing gap G2, the bearing gap G2 is set to about double the normal set value, and when this influence does not exist, the bearing gap G2 is set as large as about four times the normal set value.

Thus, in the guide bearing of the embodiment, lubrication water can be supplied efficiently to the bearing pad by rationalizing circulation paths of the lubrication water. When an abnormal event of water level decrease in particular occurs, it is possible to prevent lubrication failure of the bearing pad.

(Structure of a Third Embodiment)

Next, with reference to FIG. 22 to FIG. 25, a third embodiment will be described in detail. A guide bearing 3 of the third embodiment is such that corrosion resistance is improved in the guide bearing of the first or second embodiment. In the following description, elements common to the first and second embodiments are designated by common references, and duplicated descriptions are omitted.

Specific Example 1

Figure 22:
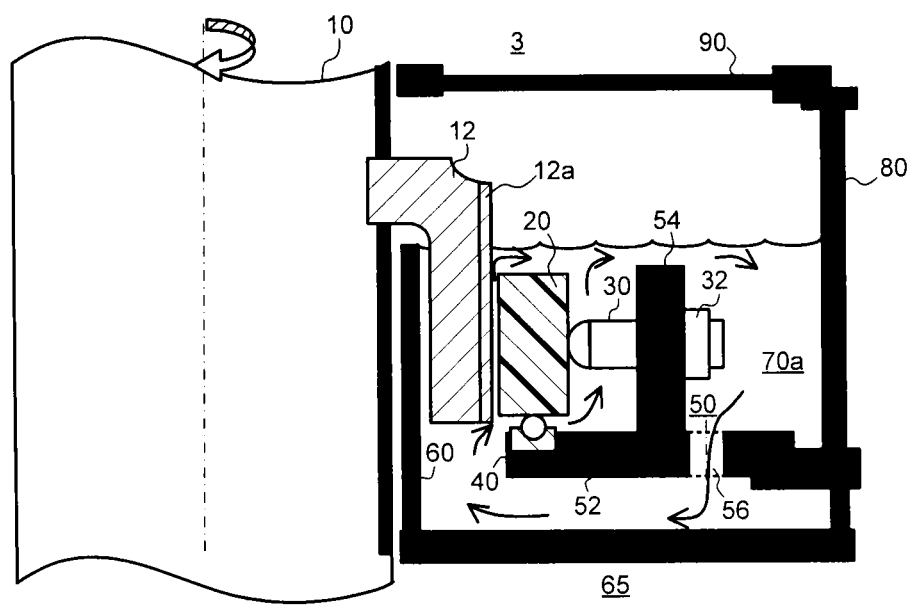
FIG. 22 is a cross-sectional view describing a surface treatment of a guide bearing of a third embodiment.

As illustrated in FIG. 22, in the guide bearing 3 of this embodiment, lubrication water 70a is tap water containing residual chlorine and chloride ions. The ball bearing unit 40 is made using an austenitic stainless steel. The adjusting bolt 30 and the pin bearing unit (not illustrated) are made using a martensitic stainless steel by treating a surface layer by electroless plating or a black antirust thin film treating method. As the black antirust thin film treating method, specifically, Raydent processing (product name) is performed. A bearing pad base metal is made using the austenitic stainless steel. The shaft skirt 12 is made using the martensitic stainless steel by HVOF spraying a WC—Ni—Cr based ductile thermal spraying material on a surface layer or made using the austenitic stainless steel. Welded components such as the bearing support stand 50, the water cylinder 60, the bearing stand 80, the bearing cover 90, and the like are made using the martensitic stainless steel by coating an epoxy resin paint or a polyurethane resin paint on a surface layer. The rotary shaft 10 excluding the shaft skirt 12 is made of a carbon steel forging by painting an epoxy resin paint or a polyurethane resin paint on surface layers of a range located within the bearing water tank and a range located on an opposing surface of the water cylinder 60.

When water is used as a lubricant, a stainless steel is employed as a material for parts in contact with water or to be placed in a wet environment. However, in the ball bearing unit 40, the pin bearing unit (not illustrated), the adjusting bolt 30, the shaft skirt 12, and the like, a minute gap occurs structurally, and thus prevention of occurrence of pitting corrosion or gap corrosion is necessary. That is, locations where corrosion may occur include a gap formed between the top portion of a ball of the ball bearing unit 40 or the pin bearing unit and a base metal of the bearing pad 20, a gap in the internal mechanism of the ball bearing unit 40, a gap formed between the tip portion of the adjusting bolt 30 and the base metal of the bearing pad 20, a gap formed in a meshing portion between the screw of the adjusting bolt 30 and the screw of the bearing support stand 50, a gap formed between the shaft skirt 12 and a sliding surface of the bearing pad 20, and the like.

Figure 24:
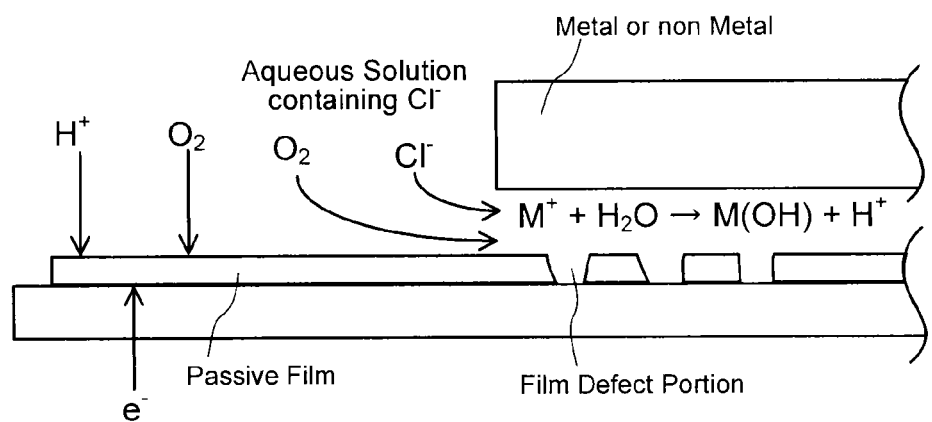
FIG. 24 is a schematic view describing occurrence of gap corrosion of a stainless steel.

As illustrated in FIG. 24, the pitting corrosion and gap corrosion are both corrosion which occurs in an environment containing halogen-based ions such as chlorine ions and/or residual chlorine, and advances when a passive film is locally broken by action of chlorine ions or the like and this portion is broken preferentially. Therefore, use of ion-exchanged water containing no or a minute amount of chlorine ions can prevent corrosion.

When tap water is used as a lubricant, although water quality standards and target values differ depending on regions, for example, the residual chlorine is 1 mg/L or less (target value) and the chloride ions is 200 mg/L or less (reference value) in the water quality of a certain district. The chloride ions have action to destabilize the passive film, and the residual chlorine has action to directly accelerate a corrosion reaction. For example, it is said that chloride ions of several tens of ppm can cause corrosion, and residual chlorine of 1 ppm can cause corrosion. Therefore, in the tap water of the above-described example, corrosion can occur on the stainless steel. Conceivable measures against this include lowering the concentration of chlorine ions or the like, lowering temperature, lowering the dissolved oxygen concentration, increasing pH, eliminating a gap structure, choosing a material to which many elements such as chrome and/or molybdenum are added and which excels in corrosion resistance, and it is necessary to employ an anticorrosion system suitable for the use environment.

When tap water can be used in a hydraulic power plant, it is desired to use the tap water as lubrication water in the aspect of operation and maintenance. When the tap water is utilized as lubrication water, since the tap water contain chloride ions and residual chlorine, the following anticorrosion system can be employed to extend the lifetime of equipment and improve reliability of the bearing. That is, when corrosion products separated from a rusted portion enter the bearing gap, they cause abnormal wear of sliding layers of the shaft skirt 12 and the bearing pad 20. It is thus necessary to reliably prevent corrosion, so as to maintain the bearing function.

An austenitic stainless steel, for example SUS304, is employed as the material of the ball bearing unit 40 and the pin bearing unit so as to prevent occurrence of pitting corrosion and gap corrosion. However, since the SUS304 is low in hardness, in order to lower contact stress with the bearing pad 20 and suppress occurrence of plastic deformation of the ball and the top portion, dimensions of the balls of the ball bearing unit 40 and the top portion of the pin bearing unit are set appropriately large as compared to the case where a high-hardness material such as SUS440C is used in these portions.

Figure 25:
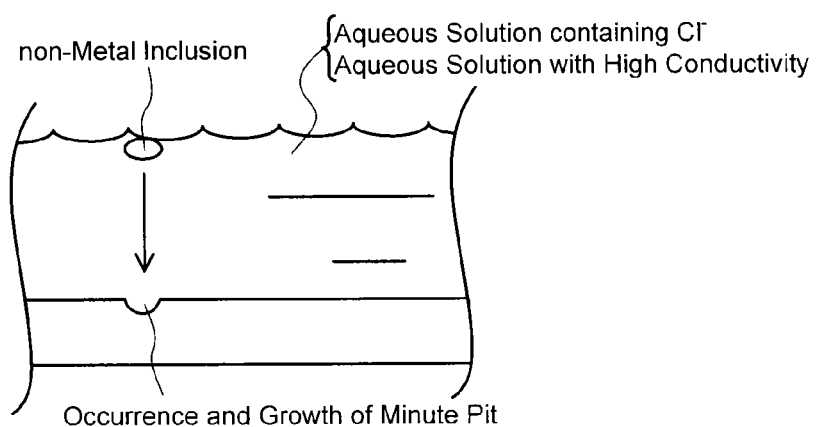
FIG. 25 is a schematic view describing occurrence of pitting corrosion of a stainless steel.

Further, a martensitic stainless steel, SUS403, is employed as the material of the adjusting bolt 30, but since the tip portion of the adjusting bolt 30 needs hardness because it pivotally supports a large load supported by the bearing pad 20, a high-hardness material, for example SUS440C is also employed. This is because when the hardness is insufficient and a recess (plastic deformation) is formed by a load, the bearing gap increases, which leads to increase in shaft vibration. Since this SUS440C is a martensitic stainless steel, considering the case where there is a large S (sulfur) content as impurity in the martensitic stainless steel as illustrated in FIG. 25 and MnS (non-metal inclusion) which is a chemical compound with Mn (manganese) is generated, the passive film on a stainless steel surface is damaged by Cl⁻ in the aqueous solution, a local battery is formed between the Mn, S as stainless steel components and the stainless steel surface, and pitting corrosion and/or gap corrosion proceeds by corrosion with reduction of dissolved oxygen in flowing water being a cathode reaction.

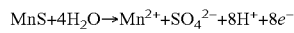  Anode reaction:

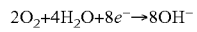  Cathode reaction:

To prevent this, corrosion is prevented by surface treatment such as electroless plating or black antirust thin film treating method which allows to obtain a coating whose thickness is uniform regardless of its shape and which is not a porous structure. When the material of the pin bearing unit is SUS440C, the same surface treatment is performed to prevent corrosion.

Further, the gap of the shaft skirt 12 and the bearing pad 20 is very narrow and often has a radius gap less than or equal to 0.3 mm. Dispersion occurs in the shaft and the bearing gap when the shaft stops at an eccentric position during a stoppage period, a bearing gap becomes 0.1 mm or less, and even a bearing pad where it is about 0.05 mm appears in a narrow portion. Thus there is a concern of gap corrosion occurrence in a narrow gap portion. That is, as the gap becomes smaller, water replacement becomes more difficult to take place, dissolved oxygen thus becomes insufficient and maintenance of passive film becomes difficult, and gap corrosion or pitting corrosion occurs therefrom.

Even when bearing gaps of all the bearing pads come within a set value, a water film between bubbles and the shaft skirt 12 becomes very thin if bubbles in the lubrication water stay in the gap during the stoppage period of the rotary shaft 10. In addition, since the water is stagnant, dissolved oxygen is not supplied to the water film portion, maintenance of the passive film is difficult due to insufficient oxygen, and gap corrosion occurs and proceeds. In this case, pitting corrosion occurs within few hours.

Further, when the hydraulic wheel stops in a state that a foreign matter such as metal enters the gap between the shaft skirt 12 and the bearing pad 20, oxygen concentration in the gap between the foreign matter and the shaft skirt 12 becomes lower than in lubrication water in the bearing gap because water exchange does not occur in the gap, an oxygen concentration cell (aeration cell) due to oxygen concentration is formed, and a gap portion where oxygen concentration is low is corroded. An anode reaction proceeds in the gap portion, a cathode reaction proceeds in an outer surface, and metal ions generated by the anode reaction turn to corrosive substances. Since the rotary shaft 10 rotates when the hydraulic wheel is activated, the sliding surface of the bearing pad and the shaft skirt 12 are damaged.

Therefore, for the shaft skirt 12, an austenitic stainless steel such as SUS316L which contains many elements such as chrome and molybdenum and excels in intergranular corrosion resistance and pitting corrosion resistance are used to prevent corrosion. When a martensitic stainless steel (for example, SUS403) is employed as the material for the shaft skirt 12, a WC—Ni—Cr based ductile thermal spraying material having corrosion resistance and high hardness is HVOF sprayed on a surface layer portion 12a in the shaft skirt 12 in FIG. 22, so as to prevent corrosion. When a foreign matter enters the bearing gap, it is possible to reduce damage to the shaft skirt 12 since the shaft skirt 12 is hard.

Further, for the base metal of the bearing pad 20, SUS316L is used to improve intergranular corrosion resistance to prevent corrosion. The bearing pad 20 needs to be kept heated at 1000° C. or higher in the process of manufacturing. In the austenitic stainless steel, when carbon dissolved in a supersaturated state is heated to about 550° C. to 900° C., a Cr carbide precipitates along a grain boundary and Cr in this portion becomes insufficient, and thus corrosion occurs easily along the grain boundary. Accordingly, the SUS316L having a small carbon content is employed, and a solid solution heat treatment which dissolves a chrome carbide is performed to prevent corrosion.

Further, the bearing support stand 50, the water cylinder 60, the bearing stand 80, and the bearing cover 90 are welded components, which are welded at around 750° C. and thereafter homogenized by a heat treatment. When the martensitic stainless steel is tempered at 450° C. to 750° C., a Cr carbide precipitates discontinuously, and thus it is conceivable that grain boundary corrosion is difficult to occur. However, grain boundary corrosion can easily occur in a gap entrance portion or the like in freshwater having slightly high Cl⁻ (chlorine) ion concentration, fresh water at 40° C. to 60° C., and high-purity water at above 100° C., and thus painting is performed to prevent corrosion. As the painting in this case, an epoxy resin paint or a polyurethane resin paint is suitable, and water contact portions and wet portions which are black-colored portions in FIG. 22 are painted.

Specific Example 2

In the guide bearing 3 illustrated in FIG. 22, bearing lubrication water 70a is ion-exchanged water. The ball bearing unit 40, the adjusting bolt 30, and the pin bearing unit (not illustrated) are made using a martensitic stainless steel. A bearing pad base metal is made using an austenitic stainless steel. The shaft skirt 12 is made using the martensitic stainless steel by HVOF spraying a WC—Ni—Cr based ductile thermal spraying material on a surface layer or made using an austenitic stainless steel. Welded components such as the bearing support stand 50, the water cylinder 60, the bearing stand 80, the bearing cover 90, and the like are made using the martensitic stainless steel. The rotary shaft 10 excluding the shaft skirt 12 is made of a carbon steel forging by painting an epoxy resin paint or a polyurethane resin paint on surface layers of a range located within the bearing water tank and a range located on an opposing surface of the water cylinder 60.

When ion-exchanged water is used as the lubrication water, if this ion-exchanged water is in contact with a metal material, metal components melts out as ions until it reaches an equilibrium state, and hence corrosion preventing measures such as coating, lining, antirust injection, and pH management may be necessary. However, since the residual chlorine amount and the chlorine ion amount of ion-exchanged water are not contained at all or are contained by a minute amount, such measures are not necessary in this embodiment.

Specifically, the ball bearing unit 40, the pin bearing unit, and the adjusting bolt 30 are made using the martensitic stainless steel. For example, the ball bearing unit 40, the pin bearing unit, and the adjusting bolt 30 which need hardness are made using SUS440C. For the ball bearing unit 40 and the pin bearing unit, a high-hardness material can be used, and thus their dimensions can be suppressed small.

Further, there may be cases where the cause of corrosion of the base metal of the shaft skirt 12 and the bearing pad 20 is not chloride ions or residual chlorine in water. Thus, the shaft skirt 12 is made using the austenitic stainless steel, SUS316L, or using the martensitic stainless steel, SUS403, by HVOF spraying a WC—Ni—Cr based ductile thermal spraying material having corrosion resistance and high hardness on a surface layer. Thus, corrosion can be prevented, and damage to resin sliding layers of the shaft skirt 12 and the bearing pad 20 when a foreign matter enters the bearing gap can be decreased.

Further, the base metal of the bearing pad 20 is made using the austenitic stainless steel, SUS316L, to prevent corrosion. The welded components of the bearing support stand 50, the water cylinder 60, the bearing stand 80, and the bearing cover 90 are made using SUS410, and corrosion thereof is prevented using an epoxy resin paint or a polyurethane resin paint.

Specific Example 3

Figure 23A:
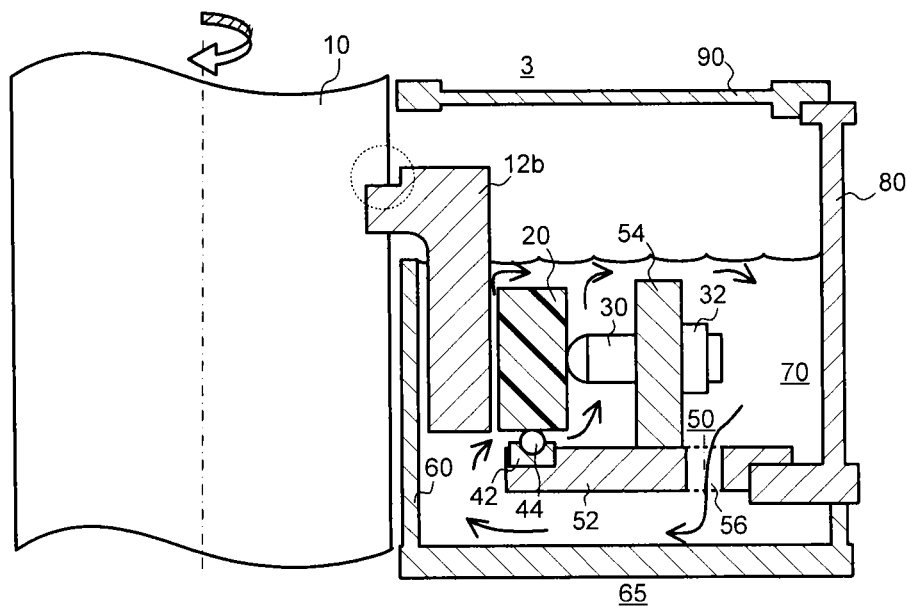
FIG. 23A is a cross-sectional view describing a method of sealing a fitting connection gap of a shaft and a shaft skirt in the guide bearing of the third embodiment.
Figure 23B:
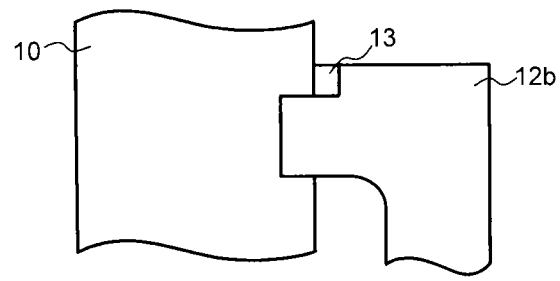
FIG. 23B is a cross-sectional view describing in enlargement the fitting connection gap of the shaft and the shaft skirt in the guide bearing of the third embodiment.

As illustrated in FIG. 23A and FIG. 23B, when main shaft skirts 12b divided in two are connected by fitting to the rotary shaft 10, a minute annular gap (portion indicated by a dashed-line circle in FIG. 23A) formed after attachment by welding is filled with an epoxy resin or a polyurethane resin 13 (FIG. 23B).

As illustrated in FIG. 23A, the shaft skirts 12b divided in two are fixed by a holding force to the rotary shaft 10 by contraction and by a knock (not illustrated) at the time of welding the two divided surfaces. However, the rotary shaft 10 and the shaft skirt 12b are not completely in close contact but a minute gap exists therebetween. Thus, when moisture enters and a wet environment is formed, there is a concern that pitting corrosion or gap corrosion occurs. Accordingly, to block this gap to prevent entrance of water, a polyurethane resin 13 with high permeability is poured into a recessed portion indicated by the dashed-line portion in FIG. 23A (FIG. 23B). Since the polyurethane resin 13 with high permeability is used, it can enter and block the gap before it hardens. Then, after hardened, the resin can prevent occurrence of gap corrosion. Note that it is also possible to make it waterproof by attaching a seal material on a lower side in a meshing portion between the shaft skirt 12b and the rotary shaft 10.

Thus, in the guide bearing of the embodiment, the lubrication water, the material of bearing parts, and the surface treatment thereof are combined appropriately, and thereby it is possible to prevent corrosion more rationally, which can lead to extension of the lifetime of equipment.

Fourth Embodiment

Next, a fourth embodiment will be described in detail with reference to FIG. 26 to FIG. 29. A guide bearing 4 of the fourth embodiment actively circulates the lubrication water in the guide bearing of the first, second, or third embodiment. In the following description, elements common to the first to third embodiment are designated by common references, and duplicated descriptions are omitted.

(Agitating and Heating of the Lubrication Water)

Figure 26:
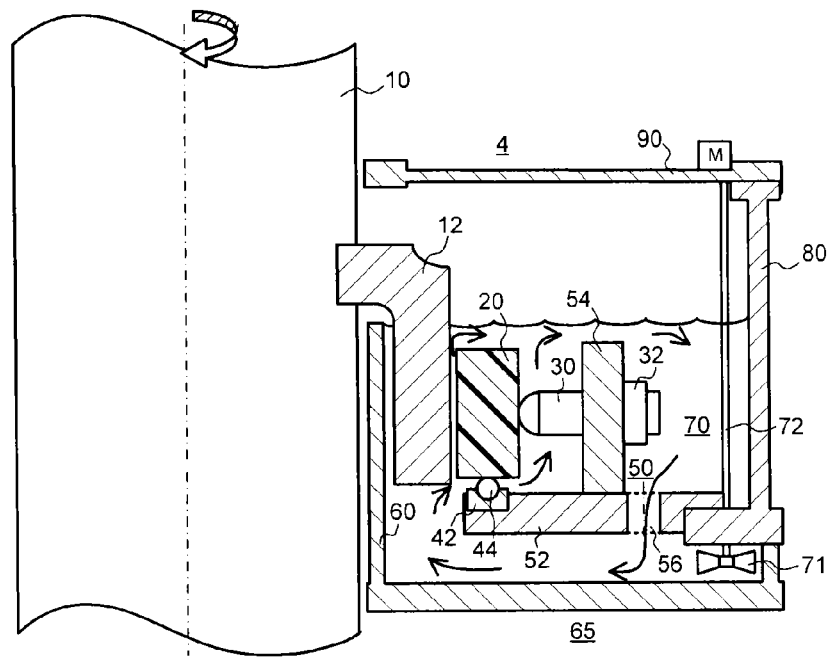
FIG. 26 is a vertical cross-sectional view describing agitation of lubrication water in a guide bearing of a fourth embodiment.

As illustrated in FIG. 26, the guide bearing 4 of this embodiment has an agitator 71 agitating the water 70 stored in the water tank 65.

During a stoppage period of the hydraulic wheel, rotation of the rotary shaft 10 stops and hence flow of the water 70 as the bearing lubrication water stops. In general, a bearing part in an assembled state includes a position where a gap is formed. For example, there is a gap in the periphery of contact portions of the ball bearing unit 40 and the bearing pad base metal, where there is a concern that when exchange of water in this gap is not performed, dissolved oxygen of water in this gap is consumed, resulting in formation of an oxygen concentration cell corroding a gap portion in which the oxygen concentration is low.

Accordingly, in the guide bearing 4 of the embodiment, a motor M of the agitator 71 is disposed on the bearing cover 90 or the bearing stand 80, and the agitator 71 is structured such that the motor M is activated and the agitator 71 operates in response to stoppage of rotation of the hydraulic wheel (rotary shaft 10). That is, when rotation of the rotary shaft 10 stops, the lubrication water can be made to flow similarly to when the hydraulic wheel is in operation, and thus water can be exchanged in the bearing gap, resulting in prevention of insufficiency of dissolved oxygen in the lubrication water 70.

Note that the agitator 71 may be structured to be portable and may be set in the water tank 65 of the guide bearing 4 during a stoppage period of the hydraulic wheel which is started and stopped not frequently or a long stoppage period for inspection or the like according to the operating mode of the hydraulic power plant. Note that in the example illustrated in FIG. 26, the agitator 71 is disposed on a lower layer side of the water tank 65 and an outer circumferential side of the ring plate 54, but it is not restrictive. The agitator 71 may be disposed on an upper layer side of the water tank 65 or on the inner circumferential side of the ring plate 54.

Figure 27:
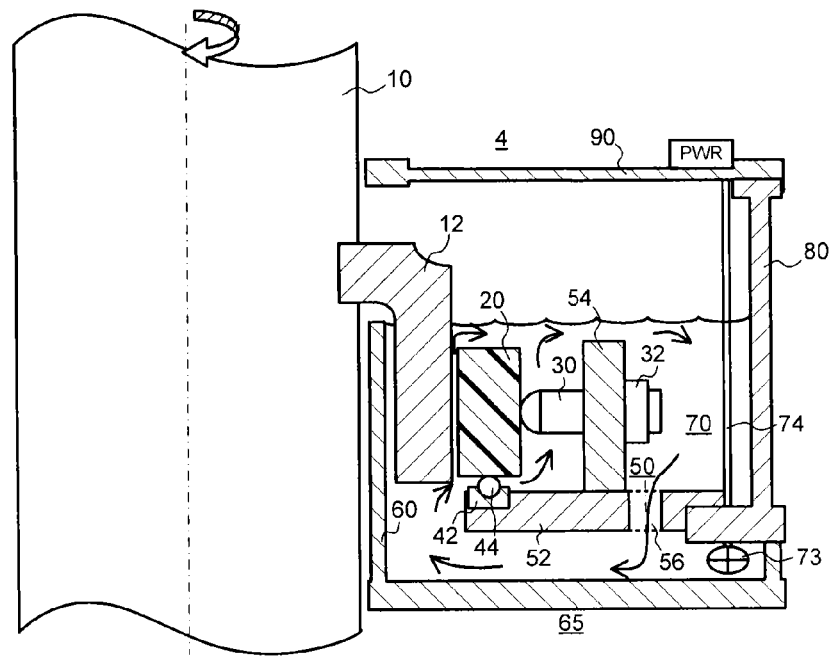
FIG. 27 is a vertical cross-sectional view describing temperature adjustment of lubrication water in the guide bearing of the fourth embodiment.

Note that as illustrated in FIG. 27, a heater 73 heating the water 70 stored in the water tank 65 may be provided instead of the agitator 71. Specifically, a temperature sensor (not illustrated) is disposed in the water tank 65 to monitor the temperature of the water 70, and when the water temperature reaches 4° C. for example during a hydraulic wheel stoppage period, heater power PWR is turned on and the heater 73 heats the water 70. As illustrated in FIG. 27, the heater 73 is disposed on a lower layer of the water tank 65. That is, convection of the water 70 is made in the water tank 65 by heating the lower layer of the water tank 65, and the entire lubrication water is heated and is circulated in the water tank 65.

The specific gravity of water becomes maximum at about 4° C. As the ambient temperature decreases and the lubrication water temperature in the water tank 65 lowers, and when the lubrication water temperature reaches 4° C., water with high specific gravity gathers in the lower layer portion of the water tank 65, and thus natural convection does not occur. As the ambient temperature continues to further decrease during the hydraulic wheel stoppage period, since the lubrication water in the water tank 65 is in a stationary, stable state, there is a concern that the water is brought to a state that it does not start to freeze when becoming lower than 0° C. and decreases to −2° C. to −3° C. in a liquid state (what is called a supercooled state).

When the hydraulic wheel starts in the supercooled state, the rotary shaft 10 rotates, and the lubrication water is agitated, the lubrication water tries to be ice in a stable state at 0° C. or lower, and hence instantly becomes a sherbet-like state. In such a state, there are concerns that the bearing loss increases significantly, and that a small piece of ice which entered the bearing gap causes abnormal wear on the bearing pad sliding surface.

Accordingly, when the lubrication water in the water tank 65 reaches 4° C., the heater power PWR is turned on to heat the water 70 as lubrication water by the heater 73. As the heater 73, a plug-type heater which can heat the lubrication water directly, or the like can be used. Note that the heater power PWR is structured to be cut off when the lubrication water temperature increases about 5° C. By such a structure, freezing or supercooling of the lubrication water can be prevented.

Figure 28:
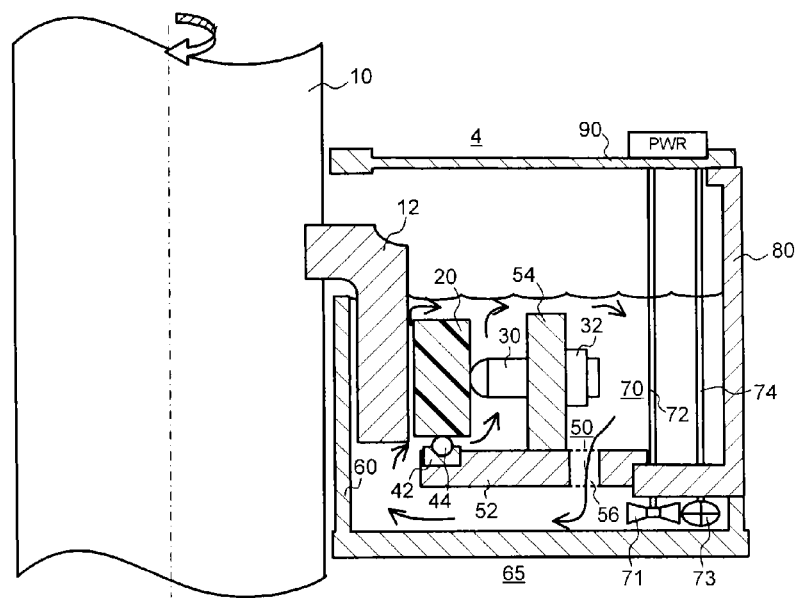
FIG. 28 is a vertical cross-sectional view illustrating a modification example of the guide bearing of the fourth embodiment.

Note that as illustrated in FIG. 28, the agitator 71 and the heater 73 may be disposed in the water tank 65, and may be structured such that, for example, only the agitator 71 is operated when the water temperature during a hydraulic wheel stoppage period exceeds 10° C., the heater 73 is operated likewise at 4° C. to 10° C., and the heater 73 and the agitator 71 are both operated likewise at 4° C. or lower.

When the water temperature exceeds 10° C. during a hydraulic wheel stoppage period, the agitator 71 is operated to make the lubrication water in the water tank 65 flow to prevent gap corrosion. When the water temperature exceeds 4° C. and is not higher than 10° C., the heater 73 is operated to prevent freezing or supercooling of the lubrication water, and dissolved oxygen is delivered to the gap portion by heat convection accompanying heating to prevent gap corrosion. When the water temperature becomes 4° C. or lower, the heater 73 and the agitator 71 are operated to prevent gap corrosion.

In pitting corrosion of stainless steel, the potential at which pitting corrosion occurs has quite strong temperature dependence, and the pitting corrosion is difficult to occur in a low temperature. That is, in an austenitic stainless steel, the pitting corrosion initiation potential at 10° C. is about double that at 30° C., and thus occurrence of pitting corrosion of stainless steel can be suppressed low by heating up to 10° C. In general, while the hydraulic wheel is in operation, the water temperature is increased by frictional heat between the bearing pad 20 and the lubrication water, agitation heat generated when the lubrication water is viscous and rotates together with the shaft skirt 12, and the like, and is often at higher than or equal to 30° C. just after stoppage. When the hydraulic wheel is stopped in this state and the ambient temperature decreases, the lubrication water temperature also decreases, but the agitator 71 can be operated to make the lubrication water flow until it lowers to 10° C., to thereby deliver dissolved oxygen to the gap in a temperature section in which the pitting corrosion initiation potential is high. That is, occurrence of corrosion can be prevented. The probability of occurrence of corrosion is low at 10° C., and thus it would barely be a problem when the agitator 71 is stopped at this lubrication water temperature. Moreover, when the lubrication water decreases to 4° C., the heater 73 operates to prevent any further decrease in lubrication water temperature. Thus, freezing of the lubrication water can be prevented.

Regarding the heater 73, the heater power PWR may be cut off when the lubrication water temperature increases to exceed 10° C. This is because, at water temperature of 10° C., the pitting corrosion initiation potential is high and hence the possibility of occurrence of pitting corrosion or the like is originally low.

The heater 73 is disposed in the lower layer portion of the water tank 65. Heat convection causing heated lubrication water to move to the upper layer portion of the water tank 65 is thereby generated, making it possible to supply dissolved oxygen to gaps at various positions. Regardless of operation of the heater 73, when the water temperature decreases to 4° C. or lower, the agitator 71 is also operated. This is because agitation of water gives energy to the water, making it difficult to freeze. Specifically, corrosion prevention and freezing prevention can be realized together by operating the agitator 71 when the lubrication water is at 10° C. or higher, operating the heater 73 at 4° C. to 10° C., and operating the heater 73 and the agitator 71 at 4° C. or lower.

(Supply of the Lubrication Water)

Figure 29:
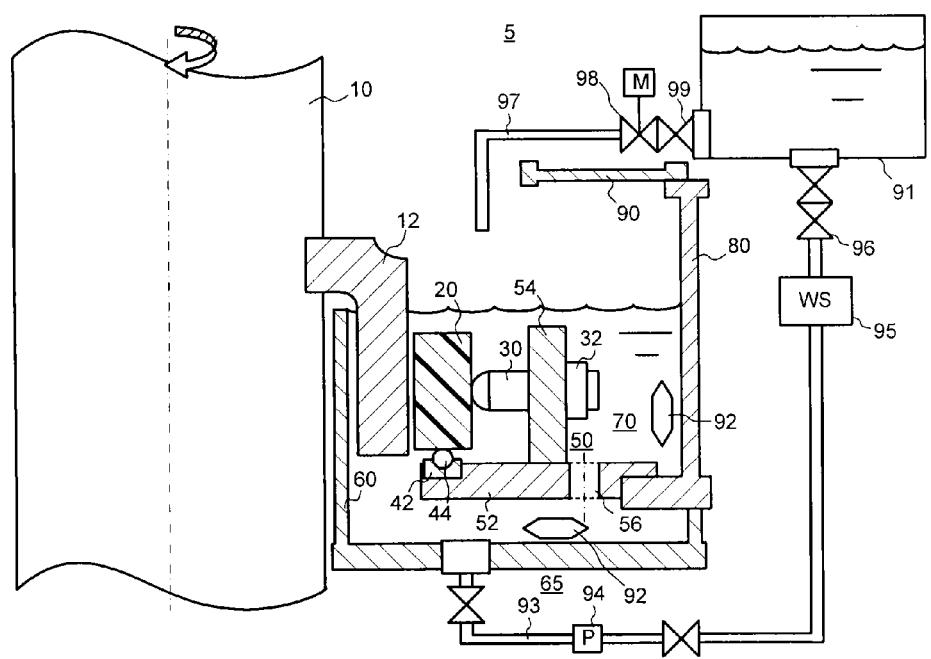
FIG. 29 is a vertical cross-sectional view illustrating a modification example of the guide bearing of the fourth embodiment.

The guide bearing 5 illustrated in FIG. 29 has a supply mechanism of lubrication water. As illustrated in FIG. 29, a makeup tank 91 is disposed at a position higher than the water tank 65 to supply lubrication water to the bearing water tank by utilizing a height difference. A magnet 92 is set to a lower layer bottom portion of the water tank 65 and to the outer circumferential side of the ring plate 54, and a pump 94, a strainer 95 with a magnet, and a one-way valve 96 are provided on a pipe 93 connecting the water tank 65 and the makeup tank 91. Further, an automatic valve 98 or a manual valve 99 is provided on a supply pipe 97 returning from the makeup tank 91 to the water tank 65, and its water inlet is positioned on the inner circumferential side of the ring plate 54 in the water tank 65.

When the water level of the water tank 65 lowers and a water level relay (not illustrated) operates, the automatic valve 98 opens, and stored water in the makeup tank 91 is supplied to the inner circumferential side of the ring plate 54 in the water tank 65 via the pipe 97. Accordingly, lubrication of the sliding surface of the bearing pad 20 on the inner circumferential side of the ring plate 54 in the water tank 65 is secured.

Further, when modification of the bearing or the like is performed, there is a possibility that a foreign matter enters the water tank 65. Thus, it is necessary to prevent such a foreign matter from entering the sliding surface of the bearing pad 20. Accordingly, the magnet 92 is set to the lower layer bottom portion of the water tank 65 and to the outer circumferential side of the ring plate 54, a communication pipe (pipe 93) connecting the water tank 65 and the makeup tank 91 is provided, and the pump 94 and a filter 95 with a magnet are provided on this pipe. While the hydraulic wheel is in operation, metal foreign matters in the lubrication water are moved to the outer circumferential side of the ring plate 54 by a centrifugal force, or fall to the lower layer of the water tank 65 by the weight of the foreign matters, which are then collected by the magnets 92.

During a hydraulic wheel stoppage period, general foreign matters and metal foreign matters which precipitated in the lower layer portion of the water tank 65 are drawn into the communication pipe 93 by driving the pump 94, and are collected by the filter 95 with a magnet. The lubrication water is once stored in the makeup tank 91 until filtration of foreign matters is completed, and thereafter the water level can be adjusted to a set value while the lubrication water is delivered from the makeup tank 91 to the inner circumferential side of the ring plate 54 in the water tank 65. In parallel with this filtration operation, the lubrication water may be returned from the makeup tank 91 to the water tank 65.

The guide bearings of the embodiments enable foreign matter removal in the lubrication water, corrosion prevention of members in contact with water, and freezing or supercooling prevention of lubrication water by agitation and convection effects by the agitator and the heater or by synergistic effects thereof.

While several embodiments of the present invention have been described, these embodiments are presented merely as examples and are not intended to limit the scope of the invention. These novel embodiments may be implemented in other various forms, and various omissions, replacements, and modifications can be made within the range not departing from the spirit of the invention. These embodiments and modifications thereof are included in the scope and spirit of the invention, and are also included within the invention described in claims and the range of equivalence thereof.

What is claimed is:

1. A bearing device for a hydraulic machine having a rotary shaft of a vertical shaft, the bearing device comprising:
   a water tank configured to store lubrication water;
   a bearing pad configured to support a skirt member provided on the rotary shaft in the lubrication water from a radial direction;
   a first supporting mechanism configured to slidably support the bearing pad from the radial direction in the lubrication water; and
   a second supporting mechanism configured to slidably support the bearing pad from a bottom portion side in an axial direction in the lubrication water,
   wherein one of a supporting surface supporting the bearing pad in the first supporting mechanism and a supported surface supported by the supporting surface in the bearing pad is formed in a convex shape,
   wherein one of a supporting surface supporting the bearing pad in the second supporting mechanism and a supported surface supported by the supporting surface in the bearing pad is formed in a convex shape,
   wherein the skirt member comprises a water drip ring at a position higher than an upper end of the bearing pad.

2. The bearing device according to claim 1,
   wherein the other of the supporting surface supporting the bearing pad in the first supporting mechanism and the supported surface supported by the supporting surface in the bearing pad is formed in a planar shape or a concave shape; and
   wherein the other of the supporting surface supporting the bearing pad in the second supporting mechanism and the supported surface supported by the supporting surface in the bearing pad is formed in a planar shape or a concave shape.

3. The bearing device according to claim 2,
   wherein the surface formed in the planar shape or concave shape has a support seat formed of a material harder than the bearing pad or a hardened part having a hardened surface in a portion contacting the surface formed in the convex shape.

4. The bearing device according to claim 1,
   wherein the first supporting mechanism comprises an adjusting bolt with a tip in a spherical shape; and
   wherein the second supporting mechanism comprises a ball bearing.

5. The bearing device according to claim 1, further comprising:
   a support stand provided with the second supporting mechanism, the support stand dividing the lubrication water in the water tank into an upper layer portion and a lower layer portion; and
   a support plate disposed on the support stand to hold the first supporting mechanism, the support plate dividing an inside of the water tank into an inner tank and an outer tank,
   wherein the support stand has an opening communicating the upper layer portion and the lower layer portion of the lubrication water in the outer tank.

6. The bearing device according to claim 5,
   wherein a position of a top portion of the support plate is higher than a position of an upper end of the bearing pad.

7. The bearing device according to claim 5,
   wherein:
   the lubrication water is tap water;
   the second supporting mechanism is made of an austenitic stainless steel;
   the first supporting mechanism is made of a martensitic stainless steel whose surface layer is treated by electroless plating or a black antirust thin film treating method;
   the bearing pad is made of an austenitic stainless steel;
   the skirt member is made of a martensitic stainless steel or an austenitic stainless steel whose surface layer is sprayed by HVOF with a WC—Ni—Cr based ductile thermal spraying material;
   the support plate and the support stand are made of a martensitic stainless steel whose surface layer is coated with an epoxy resin paint or a polyurethane resin paint; and
   the rotary shaft is made of a carbon steel forging in which a surface layer of a portion corresponding to the water tank is coated with an epoxy resin paint or a polyurethane resin paint.

8. The bearing device according to claim 5,
   wherein:
   the lubrication water is ion-exchanged water;
   the first and second supporting mechanisms are made of a martensitic stainless steel;
   the bearing pad is made of an austenitic stainless steel;
   the skirt member is made of a martensitic stainless steel or an austenitic stainless steel whose surface layer is sprayed by HVOF with a WC—Ni—Cr based ductile thermal spraying material;
   the support plate and the support stand are made of a martensitic stainless steel; and
   the rotary shaft is made of a carbon steel forging in which a surface layer of a portion corresponding to the water tank is coated with an epoxy resin paint or a polyurethane resin paint.

9. The bearing device according to claim 5,
   wherein the rotary shaft and the skirt member forms a gap filled with an epoxy resin or a polyurethane resin at a joining portion therebetween.

10. The bearing device according to claim 1,
    wherein the second supporting mechanism comprises a ball bearing having a plurality of balls with the same heights to a top portion.

11. The bearing device according to claim 10,
    wherein the plurality of balls of the ball bearing are disposed on a straight line matching a tangential direction of the rotary shaft at a circumferential center position of the rotary shaft in the bearing pad or a straight line being tilted by a tilt angle of the bearing pad when the rotary shaft rotates.

12. The bearing device according to claim 1,
    wherein the second supporting mechanism comprises a ball bearing having three balls arranged on a straight line with the same heights to a top portion.

13. The bearing device according to claim 1,
    wherein the second supporting mechanism comprises a ball bearing having a plurality of balls arranged on a straight line with the same heights to a top portion, and is disposed so that a center of gravity of the bearing pad is located on a side of the rotary shaft with respect to the straight line with the plurality of balls arranged thereon.

14. The bearing device according to claim 1, wherein the second supporting mechanism comprises a bearing having a positioning pin with a tip in a spherical shape.

15. The bearing device according to claim 1, wherein the second supporting mechanism comprises a bearing having a roller.

16. The bearing device according to claim 1, wherein the first supporting mechanism comprises a ball bearing configured to support the bearing pad.

17. The bearing device according to claim 1, wherein the bearing pad comprises a positioning pin or a ball bearing on the supported surface in a radial direction; and
wherein the first supporting mechanism has a planar shape or a concave shape as the supporting surface.

18. The bearing device according to claim 1, further comprising an agitator agitating the lubrication water in the water tank,
wherein the agitator operates during a stoppage period of the rotary shaft to make the lubrication water flow in the water tank.

19. The bearing device according to claim 1, further comprising a heater configured to heat the lubrication water in the water tank, the heater heating the lubrication water when a water temperature of the lubrication water is 4° C. or lower during a stoppage period of the rotary shaft.

20. The bearing device according to claim 1, further comprising:
an agitator configured to agitate the lubrication water in the water tank; and
a heater configured to heat the lubrication water in the water tank, wherein, during a stoppage period of the rotary shaft, the agitator agitates the lubrication water when a water temperature of the lubrication water is 10° C. or higher, the heater heats the lubrication water when the water temperature of the lubrication water is between 4° C. and 10° C., and the heater heats the lubrication water and the agitator agitates the lubrication water when the water temperature of the lubrication water is 4° C. or less.

21. A hydraulic machine, comprising a bearing device according to claim 1 configured to support a radial load of the rotary shaft.

22. A bearing device for a hydraulic machine having a rotary shaft of a vertical shaft, the bearing device comprising:
a water tank configured to store lubrication water;
a bearing pad configured to support a skirt member provided on the rotary shaft in the lubrication water from a radial direction;
a first supporting mechanism configured to slidably support the bearing pad from the radial direction in the lubrication water;
a second supporting mechanism configured to slidably support the bearing pad from a bottom portion side in an axial direction in the lubrication water;
a makeup tank disposed at a position higher than a disposed position of the water tank, the makeup tank being configured to store the lubrication water;
a lifting pipe connecting the water tank and the makeup tank;
a pump disposed on the lifting pipe, the pump being configured to pump up the lubrication water in the water tank to the makeup tank;
a water supply pipe configured to supply the lubrication water in the makeup tank to the water tank; and
a valve disposed on the water supply pipe, the valve being configured to control supply of the lubrication water to the water tank,
wherein one of a supporting surface supporting the bearing pad in the first supporting mechanism and a supported surface supported by the supporting surface in the bearing pad is formed in a convex shape,
wherein one of a supporting surface supporting the bearing pad in the second supporting mechanism and a supported surface supported by the supporting surface in the bearing pad is formed in a convex shape.

23. A hydraulic machine, comprising:
a Pelton wheel configured to perform a one jet operation;
a first bearing device configured to support a radial load of a rotary shaft of the Pelton wheel; and
a second bearing device disposed to oppose the first bearing device across the rotary shaft, the second bearing device being configured to support an anti-radial load of the rotary shaft,
the first bearing device comprising:
a first water tank configured to store first lubrication water,
a first bearing pad configured to support a first skirt member provided on the rotary shaft in the first lubrication water from a radial direction,
a first supporting mechanism configured to slidably support the first bearing pad from the radial direction in the first lubrication water, and
a second supporting mechanism configured to slidably support the first bearing pad from a bottom portion side in an axial direction in the first lubrication water;
the second bearing device comprising:
a second water tank configured to store second lubrication water,
a second bearing pad configured to support a second skirt member provided on the rotary shaft in the second lubrication water from the radial direction,
a third supporting mechanism configured to slidably support the second bearing pad from the radial direction in the second lubrication water, and
a fourth supporting mechanism configured to slidably support the second bearing pad from a bottom portion side in the axial direction in the second lubrication water;
wherein one of a supporting surface supporting the first bearing pad in the first supporting mechanism and a supported surface supported by the supporting surface in the first bearing pad is formed in a convex shape, and
wherein one of a supporting surface supporting the first bearing pad in the second supporting mechanism and a supported surface supported by the supporting surface in the first bearing pad is formed in a convex shape,
wherein one of a supporting surface supporting the second bearing pad in the third supporting mechanism and a supported surface supported by the supporting surface in the second bearing pad is formed in a convex shape, and
wherein one of a supporting surface supporting the second bearing pad in the fourth supporting mechanism and a supported surface supported by the supporting surface in the second bearing pad is formed in a convex shape, wherein a bearing gap of the first bearing pad supporting the radial load is set to a predetermined value, and wherein a bearing gap of the second bearing pad supporting the anti-radial load is set wider than the predetermined value.

* * * * *